United States Patent
Gao et al.

(10) Patent No.: US 12,217,465 B2
(45) Date of Patent: Feb. 4, 2025

(54) METHOD AND APPARATUS FOR POINT CLOUD CODING

(71) Applicant: TENCENT AMERICA LLC, Palo Alto, CA (US)

(72) Inventors: Wen Gao, West Windsor, NJ (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 631 days.

(21) Appl. No.: 17/466,729

(22) Filed: Sep. 3, 2021

(65) Prior Publication Data

US 2022/0180567 A1    Jun. 9, 2022

Related U.S. Application Data

(60) Provisional application No. 63/121,835, filed on Dec. 4, 2020.

(51) Int. Cl.
   *G06T 9/40* (2006.01)
   *G06T 3/40* (2006.01)
   *G06T 9/00* (2006.01)

(52) U.S. Cl.
   CPC ............... *G06T 9/001* (2013.01); *G06T 3/40* (2013.01); *G06T 9/40* (2013.01)

(58) Field of Classification Search
   None
   See application file for complete search history.

(56) References Cited

U.S. PATENT DOCUMENTS

| | | |
|---|---|---|
| 2012/0106858 A1 | 5/2012 | Cai et al. |
| 2016/0142724 A1 | 5/2016 | Esenlik et al. |
| 2016/0373756 A1 | 12/2016 | Yu et al. |
| 2020/0021844 A1 | 1/2020 | Yea et al. |

FOREIGN PATENT DOCUMENTS

| | | | | |
|---|---|---|---|---|
| CN | 105898298 B | * | 6/2019 | ............... G06T 9/40 |
| JP | 2019062554 A | * | 4/2019 | ........... H04N 19/119 |
| WO | WO 2020/072665 A1 | | 4/2020 | |

OTHER PUBLICATIONS

Chan, Y.L.—"Overview of current development in depth map coding of 3D video and its future"—IET Signal Processing—Nov. 2019, pp. 1-14 (Year: 2019).*

International Search Report and Written Opinion issued Jan. 31, 2022 in PCT/US2021/051430.

(Continued)

*Primary Examiner* — Bernard Krasnic
(74) *Attorney, Agent, or Firm* — ArentFox Schiff LLP

(57) ABSTRACT

According to an aspect of the disclosure, a method of point cloud geometry encoding in a point cloud encoder is provided. In the method, geometry coding is performed on a point cloud at a first partition depth. Further, a plurality of largest coding units (LCUs) of the point cloud is determined at a second partition depth. A coding state of a LCU of the plurality of LCUs of the point cloud is set at the second partition depth. The geometry coding is performed on the plurality of LCUs of the point cloud at the second partition depth based on the coding state of the LCU at the second partition depth.

20 Claims, 20 Drawing Sheets

(56) References Cited

OTHER PUBLICATIONS

Garcia et al., "Intra-frame context-based octree coding for point-cloud geometry." 2018 25th IEEE International Conference on Image Processing (ICIP). IEEE, 2018. Oct. 7, 2018, Retrieved on Nov. 13, 2021 from <https://ieeexplore.ieee.org/abstract/document/8451802> entire document.

Stefan Gumhold, et al., "Predictive Point-Cloud Compression", SIGGRAPH '05: ACM SIGGRAPH 2005 sketches, Jul. 31, 2005, p. 137.

Rufael Mekuria, et al., "Requirements for Point Cloud Compression", International Organisation for Standardisation, Organisation Internationale De Normalisation, Coding of Moving Pictures and Audio, ISO/IEC JTC1/SC29/WG11 MPEG2016/n16330, Geneva, CH, Feb. 2016, 3 pages.

Christian Tulvan, et al., "Use Cases for Point Cloud Compression (PCC)", International Organisation for Standardisation, Organisation Internationale De Normalisation, Coding of Moving Pictures and Audio, ISO/IEC JTC1/SC29/WG11 MPEG2015/N16331, Geneva, CH, Jun. 2016, 8 pages.

"Information technology—MPEG-I (Coded Representation of Immersive Media)—Part 9: Geometry-based Point Cloud Compression", ISO/IEC JTC1/SC 29/WG 11, ISO/IEC 23090-9(E), 2019, 102 pages.

"G-PCC codec description v5", International Organisation for Standardisation, Organisation Internationale De Normalisation, Coding of Moving Pictures and Audio, ISO/IEC JTC1/SC29/WG11, Doc. N18891, Geneva, CH, Oct. 2019, 75 pages.

Supplementary European Search Report issued May 10, 2023 in Application No. 21901201.0, p. 1-14.

Flynn D et al : "G-PCC: Review of parallel octree sub-streams", 130. MPEG Meeting; Apr. 20, 2020-Apr. 24, 2020; Alpbach; (Motion Picture Expert Group or ISO/IEC JTC1/SC29/WG11), No. m53684, Apr. 15, 2020, pp. 1-3.

Xiang Zhang et al: "[G-PCC][CE13.22] Report on Parallel Octree Coding for Point Cloud Compression", 129. MPEG Meeting; Jan. 13, 2020-Jan. 17, 2020; Brussels; (Motion Picture Expert Group or ISO/IEC JTC1/SC29/WG11), No. m52397 Jan. 16, 2020, pp. 1-6.

Flynn D et al: "[G-PCC] [New proposal] Predictive Geometry Coding", 128. MPEG Meeting; Oct. 7, 2019-Oct. 11, 2019; Geneva; (Motion Picture Expert Group or ISO/IEC JTC1/SC29/WG11), No. m51012, Oct. 6, 2019, pp. 1-10.

Geert Van Der Auwera et al: "[G-PCC] Octree and predictive geometry coding comparison for profile discussion", 132. MPEG Meeting; Oct. 12, 2020-Oct. 16, 2020; Online; (Motion Picture Expert Group or ISO/IEC JTC1/SC29/WG11), No. m55602, Oct. 15, 2020, pp. 1-3.

\* cited by examiner

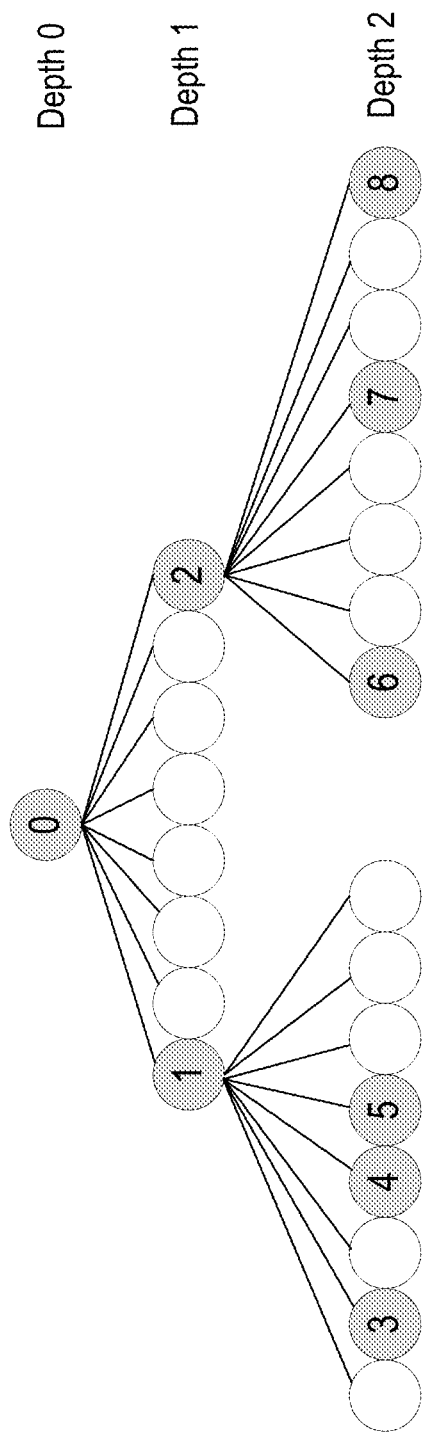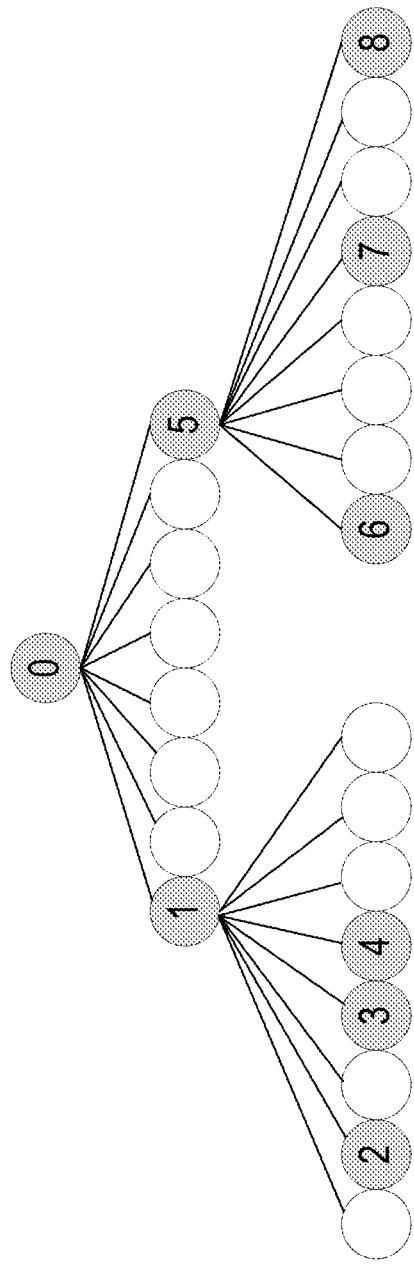
FIG. 10A
FIG. 10B

METHOD AND APPARATUS FOR POINT CLOUD CODING

INCORPORATION BY REFERENCE

This present application claims the benefit of priority to U.S. Provisional Application No. 63/121,835, "UPDATE ON NODE-BASED GEOMETRY AND ATTRIBUTE CODING FOR A POINT CLOUD" filed on Dec. 4, 2020, which is incorporated by reference herein in its entirety.

TECHNICAL FIELD

The present disclosure describes embodiments generally related to point cloud coding, including node-based geometry and attribute coding for a point cloud.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and/or various other attributes. Such point clouds may include large amounts of data and may be costly and time-consuming to store and transmit.

SUMMARY

Aspects of the disclosure provide methods and apparatuses for point cloud compression and decompression. According to an aspect of the disclosure, a method of point cloud geometry encoding in a point cloud encoder is provided. In the method, a geometry coding can be performed on a point cloud at a first partition depth. Further, a plurality of largest coding units (LCUs) of the point cloud can be determined at a second partition depth. A coding state of a LCU of the plurality of LCUs of the point cloud can be set at the second partition depth. The geometry coding can be performed on the plurality of LCUs of the point cloud at the second partition depth based on the coding state of the LCU at the second partition depth.

In some embodiments, the geometry coding can include one of an octree-based geometry coding and a predictive tree-based coding.

In an embodiment, the coding state of the LCU can be set with an initial state of the point cloud, where the initial state of the point cloud can be obtained prior to the point cloud being coded based on the geometry coding.

In another embodiment, when the LCU is a first LCU of the plurality of LCUs of the point cloud at the second partition depth, the coding state can be obtained and stored after the point cloud is coded based on the geometry coding at the first partition depth.

In yet another embodiment, when the LCU is not the first LCU of the plurality of LCUs of the point cloud at the second partition depth, the coding state of the LCU can be set with a stored coding state. The stored coding state can be either (i) obtained after the point cloud is coded based on the geometry coding at the first partition depth or (ii) stored prior to the first LCU of the plurality of LCUs of the point cloud being coded based on the geometry coding at the second partition depth.

In some embodiments, the coding state can include at least one of a context for an entropy coding associated with the LCU or geometry occupancy history information associated with the LCU.

In some embodiments, each of the plurality of LCUs can include a respective node at the second partition depth.

According to another aspect of the disclosure, a method of point cloud geometry encoding in a point cloud encoder is provided. In the method, a density of a largest coding unit (LCU) of a point cloud can be determined. The density of the LCU can be a ratio of a number of points in the LCU and a volume of the LCU. A geometry coding mode of the LCU can be determined based on the density of the LCU and a first threshold value. Geometry coding mode information can further be signaled in a bitstream, where the geometry coding mode information can indicate the determined geometry coding mode of the LCU that is based on the density of the LCU and the first threshold value.

In an example, the geometry coding mode of the LCU can be determined as a predictive tree geometry coding based on the density of the LCU being equal to or less than the first threshold value. In another example, the geometry coding mode of the LCU can be determined as an octree-based geometry coding based on the density of the LCU being larger than the first threshold value.

In an example, the geometry coding mode of the LCU can be determined as a predictive tree geometry coding based on the density of the LCU being equal to or larger than the first threshold value and equal to or less than a second threshold value, where the second threshold value can be larger than the first threshold value. In yet another example, the geometry coding mode of the LCU can be determined as an octree-based geometry coding based on the density of the LCU being either less than the first threshold value or larger than the second threshold value.

In an example, the geometry coding mode of the LCU can be determined as a predictive tree geometry coding based on (i) the density of the LCU being equal to or larger than the first threshold value and equal to or less than a second threshold value, and (ii) the number of points in the LCU being equal to or larger than a point number threshold value. In another example, the geometry coding mode of the LCU can be determined as an octree-based geometry coding based on one of (i) the density of the LCU being either less than the first threshold value or larger than the second threshold value, and (ii) the number of points in the LCU being less than the point number threshold value.

In some embodiments, the geometry coding mode information can be signaled with a first value based on the geometry coding mode being a first geometry coding mode. The geometry coding mode information can be signaled with a second value based on the geometry coding mode being a second geometry coding mode.

In the method, the geometry coding mode information can be entropy coded with a context or can be coded with a by-pass coding.

In an embodiment, the geometry coding mode information can be signaled with a first value based on the geometry coding mode being a first geometry coding mode. In another embodiment, the geometry coding mode information can be signaled with a second value based on the geometry coding mode being a second geometry coding mode. In yet another example, the geometry coding mode information can be signaled with a third value based on the geometry coding mode being a third geometry coding mode.

In some embodiments, binarization information can be signaled with a first value in only a first bin, where the binarization information with the first value can be indicative of a first geometry coding mode. In some embodiments, the binarization information can be signaled with a second value in the first bin and with the first value in a subsequent second bin, where the binarization information with the second value in the first bin and with the first value in the second bin can be indicative of a second geometry coding mode. In some embodiments, the binarization information can be signaled with the second value in the first bin and with the second value in the second bin, where the binarization information with the second value in the first and second bins can be indicative of a third geometry coding mode.

In some embodiments, the binarization information in the first bin can be entropy coded with a first context and the binarization information in the second bin can be entropy coded with a second context.

In some examples, the apparatus for processing point cloud data includes processing circuitry that is configured to perform one or more of the methods described above. For example, the apparatus can include processing circuitry that is configured to perform a geometry coding on a point cloud at a first partition depth. The processing circuitry can also be configured to determine a plurality of largest coding units (LCUs) of the point cloud at a second partition depth. The processing circuitry can be configured to set a coding state of a LCU of the plurality of LCUs of the point cloud at the second partition depth. The processing circuitry can be configured to perform the geometry coding on the plurality of LCUs of the point cloud at the second partition depth based on the coding state of the LCU at the second partition depth.

In another example, the processing circuitry can be configured to determine a density of a largest coding unit (LCU) of a point cloud. The density of the LCU can be a ratio of a number of points in the LCU and a volume of the LCU. The processing circuitry can be configured to determine a geometry coding mode of the LCU based on the density of the LCU and a first threshold value. The processing circuitry can further be configured to signal geometry coding mode information in a bitstream, where the geometry coding mode information can indicate the determined geometry coding mode of the LCU that is based on the density of the LCU and the first threshold value.

According to yet another aspect of the disclosure, a non-transitory computer-readable storage medium is provided. The non-transitory computer-readable storage medium stores instructions which when executed by at least one processor cause the at least one processor to perform one or more of the methods described above. For example, in the method, a geometry coding can be performed on a point cloud at a first partition depth. Further, a plurality of largest coding units (LCUs) of the point cloud can be determined at a second partition depth. A coding state of a LCU of the plurality of LCUs of the point cloud can be set at the second partition depth. The geometry coding can be performed on the plurality of LCUs of the point cloud at the second partition depth based on the coding state of the LCU at the second partition depth.

In another example, in the method, a density of a largest coding unit (LCU) of a point cloud can be determined. The density of the LCU can be a ratio of a number of points in the LCU and a volume of the LCU. A geometry coding mode of the LCU can be determined based on the density of the LCU and a first threshold value. Geometry coding mode information can further be signaled in a bitstream, where the geometry coding mode information can indicate the determined geometry coding mode of the LCU that is based on the density of the LCU and the first threshold value.

BRIEF DESCRIPTION OF THE DRAWINGS

Further features, the nature, and various advantages of the disclosed subject matter will be more apparent from the following detailed description and the accompanying drawings in which:

FIG. 10A shows a diagram illustrating a breadth-first traversal order in the octree partition technique according to some embodiments of the disclosure.

FIG. 10B shows a diagram illustrating a depth-first traversal order in the octree partition technique according to some embodiments of the disclosure.

DETAILED DESCRIPTION OF EMBODIMENTS

Point clouds have become more widely used in recent years. For example, a point cloud can be used in autonomous driving vehicles for object detection and localization. A point cloud can also be used in geographic information systems (GIS) for mapping, and used in cultural heritage to visualize and archive cultural heritage objects and collections, etc.

A point cloud can contain a set of high dimensional points, typically in three dimensions (3D). Each of the high dimensional points can include 3D position information and additional attributes such as color, reflectance, etc. The high dimensional points can be captured using multiple cameras and depth sensors, or Lidar in various setups, and may be formed of thousands or billions of points to realistically represent the original scenes.

Thus, compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic point clouds. In addition, Audio Video coding standards workgroup of China also created an ad-hoc group (AVS-PCC) to standardize the compression of point clouds.

Figure 1:
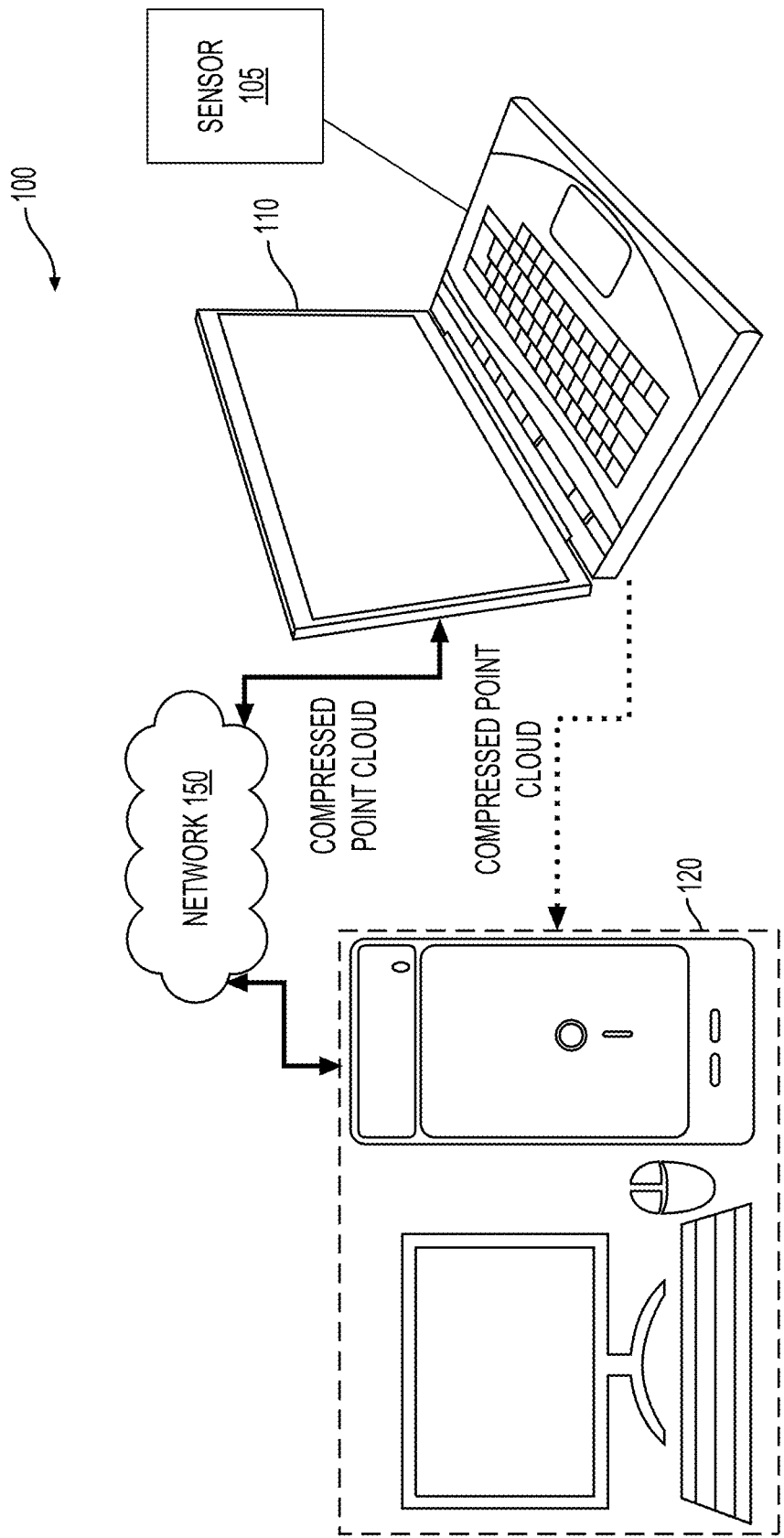
FIG. 1 is a schematic illustration of a simplified block diagram of a communication system in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit a compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
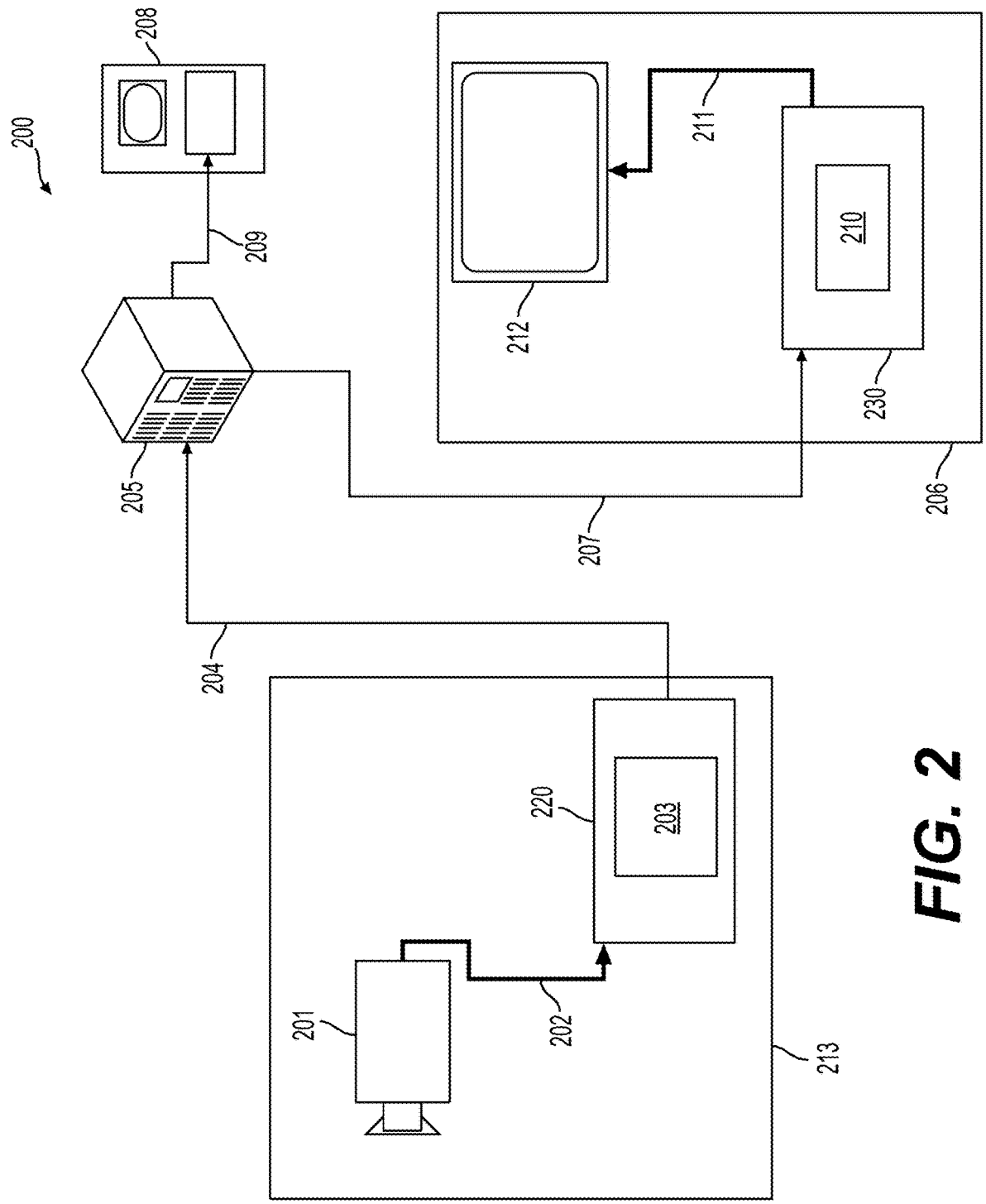
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, a 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
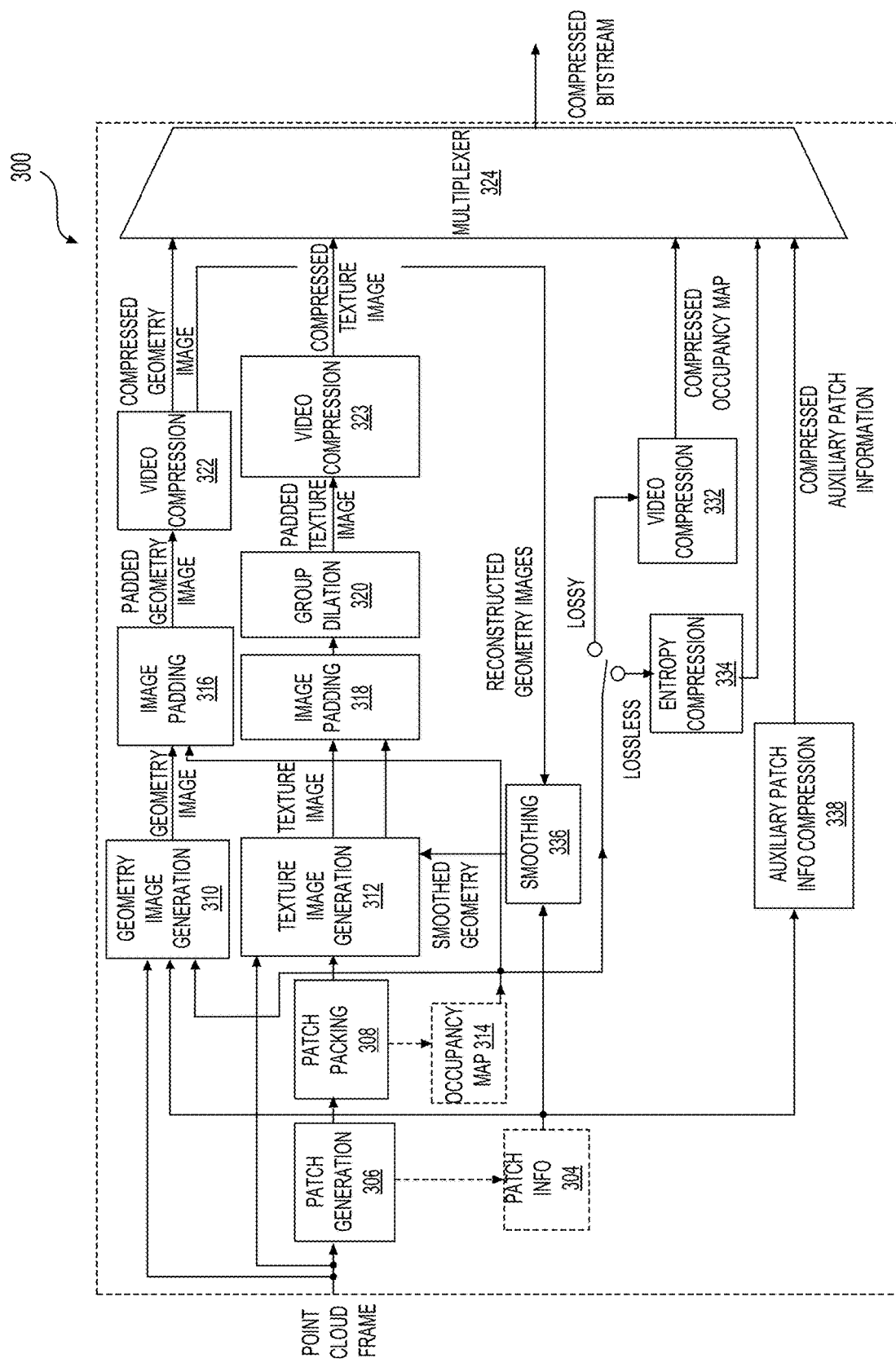
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

A patch generally may refer to a contiguous subset of the surface described by the point cloud. In an example, a patch includes points with surface normal vectors that deviate from one another less than a threshold amount. The patch generation module (306) segments a point cloud into a set of patches, which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, a geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate and does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g., geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, and/or the compressed auxiliary patch information into a compressed bitstream.

Figure 4:
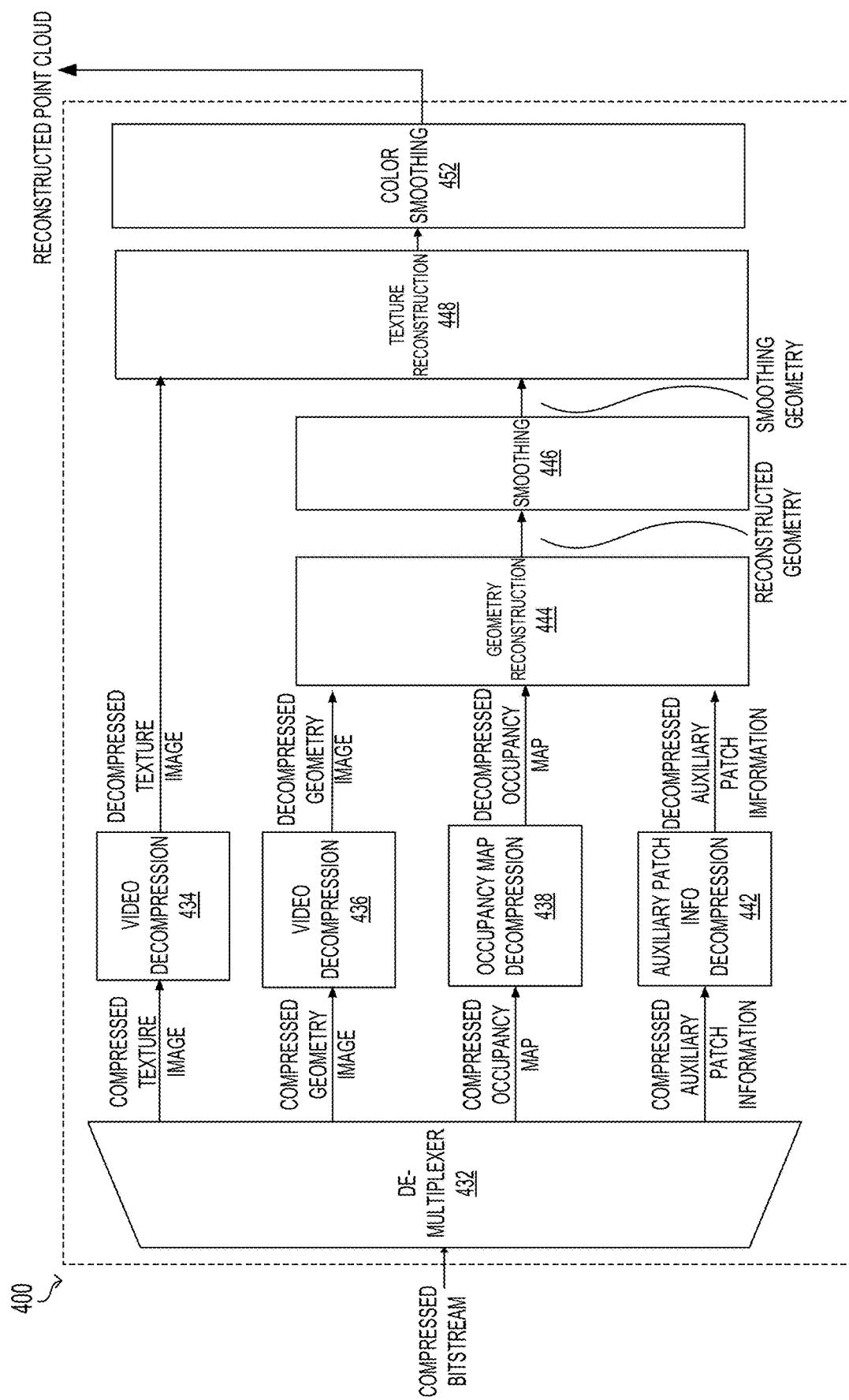
FIG. 4 shows a block diagram of a decoder for decoding a compressed bitstream corresponding to point cloud frames according to some embodiments.

FIG. 4 shows a block diagram of a V-PCC decoder (400) for decoding a compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates a reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into a compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
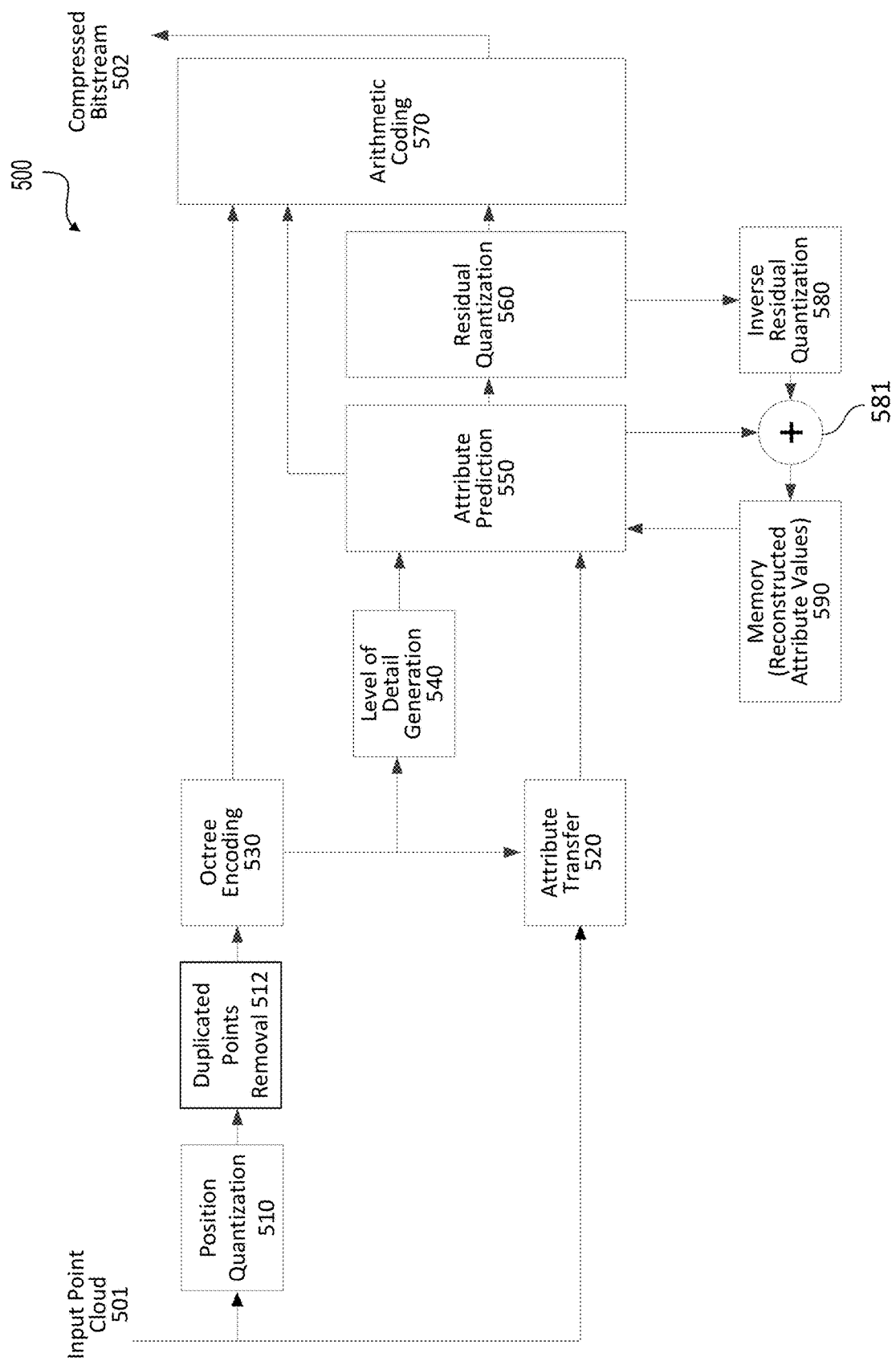
FIG. 5 shows a block diagram of an encoder for encoding point cloud frames, according to some embodiments.

FIG. 5 shows a block diagram of a G-PPC encoder (500) in accordance with some embodiments. The encoder (500) can be configured to receive point cloud data and compress the point cloud data to generate a bit stream carrying compressed point cloud data. In an embodiment, the encoder (500) can include a position quantization module (510), a duplicated points removal module (512), an octree encoding module (530), an attribute transfer module (520), a level of detail (LOD) generation module (540), an attribute prediction module (550), a residual quantization module (560), an arithmetic coding module (570), an inverse residual quantization module (580), an addition module (581), and a memory (590) to store reconstructed attribute values.

As shown, an input point cloud (501) can be received at the encoder (500). Positions (e.g., 3D coordinates) of the point cloud (501) are provided to the quantization module (510). The quantization module (510) is configured to quantize the coordinates to generate quantized positions. The duplicated points removal module (512) is configured to receive the quantized positions and perform a filter process to identify and remove duplicated points. The octree encoding module (530) is configured to receive filtered positions from the duplicated points removal module (512), and perform an octree-based encoding process to generate a sequence of occupancy codes that describe a 3D grid of voxels. The occupancy codes are provided to the arithmetic coding module (570).

The attribute transfer module (520) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (530). The attributes after the transfer operations are provided to the attribute prediction module (550). The LOD generation module (540) is configured to operate on the re-ordered points output from the octree encoding module (530), and re-organize the points into different LODs. LOD information is supplied to the attribute prediction module (550).

The attribute prediction module (550) processes the points according to an LOD-based order indicated by the LOD information from the LOD generation module (540). The attribute prediction module (550) generates an attribute prediction for a current point based on reconstructed attributes of a set of neighboring points of the current point stored in the memory (590). Prediction residuals can subsequently be obtained based on original attribute values received from the attribute transfer module (520) and locally generated attribute predictions. When candidate indices are used in the respective attribute prediction process, an index corresponding to a selected prediction candidate may be provided to the arithmetic coding module (570).

The residual quantization module (560) is configured to receive the prediction residuals from the attribute prediction module (550), and perform quantization to generate quantized residuals. The quantized residuals are provided to the arithmetic coding module (570).

The inverse residual quantization module (580) is configured to receive the quantized residuals from the residual quantization module (560), and generate reconstructed prediction residuals by performing an inverse of the quantization operations performed at the residual quantization module (560). The addition module (581) is configured to receive the reconstructed prediction residuals from the inverse residual quantization module (580), and the respective attribute predictions from the attribute prediction module (550). By combining the reconstructed prediction residuals and the attribute predictions, the reconstructed attribute values are generated and stored to the memory (590).

The arithmetic coding module (570) is configured to receive the occupancy codes, the candidate indices (if used), the quantized residuals (if generated), and other information, and perform entropy encoding to further compress the received values or information. As a result, a compressed bitstream (502) carrying the compressed information can be generated. The bitstream (502) may be transmitted, or otherwise provided, to a decoder that decodes the compressed bitstream, or may be stored in a storage device.

Figure 6:
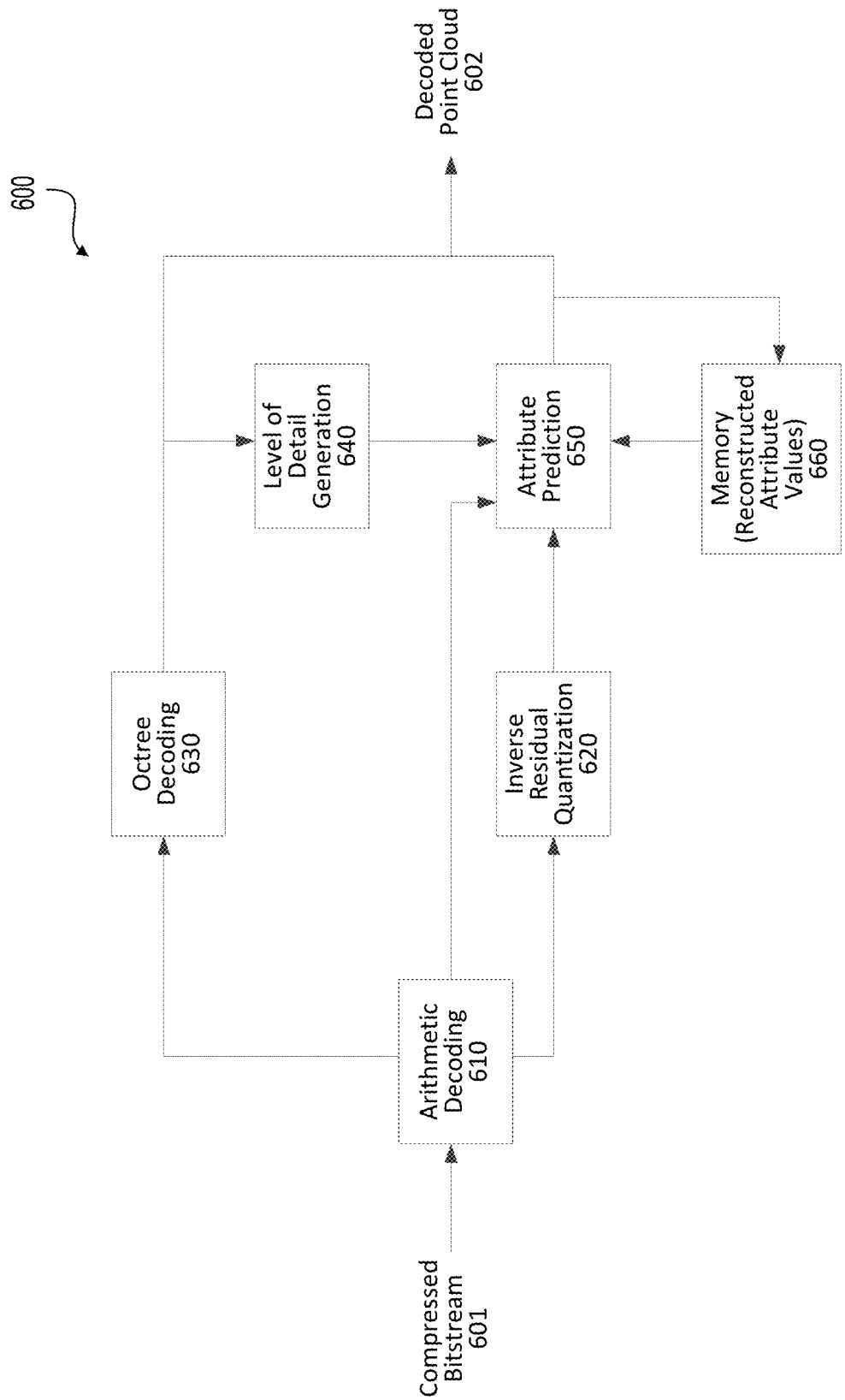
FIG. 6 shows a block diagram of a decoder for decoding a compressed bitstream corresponding to point cloud frames according to some embodiments.

FIG. 6 shows a block diagram of a G-PCC decoder (600) in accordance with an embodiment. The decoder (600) can be configured to receive a compressed bitstream and perform point cloud data decompression to decompress the bitstream to generate decoded point cloud data. In an embodiment, the decoder (600) can include an arithmetic decoding module (610), an inverse residual quantization module (620), an octree decoding module (630), an LOD generation module (640), an attribute prediction module (650), and a memory (660) to store reconstructed attribute values.

As shown, a compressed bitstream (601) can be received at the arithmetic decoding module (610). The arithmetic decoding module (610) is configured to decode the compressed bitstream (601) to obtain quantized residuals (if generated) and occupancy codes of a point cloud. The octree decoding module (630) is configured to determine reconstructed positions of points in the point cloud according to the occupancy codes. The LOD generation module (640) is configured to re-organize the points into different LODs based on the reconstructed positions, and determine an LOD-based order. The inverse residual quantization module (620) is configured to generate reconstructed residuals based on the quantized residuals received from the arithmetic decoding module (610).

The attribute prediction module (650) is configured to perform an attribute prediction process to determine attribute predictions for the points according to the LOD-based order. For example, an attribute prediction of a current point can be determined based on reconstructed attribute values of neighboring points of the current point stored in the memory (660). In some examples, the attribute prediction can be combined with a respective reconstructed residual to generate a reconstructed attribute for the current point.

A sequence of reconstructed attributes generated from the attribute prediction module (650) together with the reconstructed positions generated from the octree decoding module (630) corresponds to a decoded point cloud (602) that is output from the decoder (600) in one example. In addition, the reconstructed attributes are also stored into the memory (660) and can be subsequently used for deriving attribute predictions for subsequent points.

In various embodiments, the encoder (300), the decoder (400), the encoder (500), and/or the decoder (600) can be implemented with hardware, software, or combination thereof. For example, the encoder (300), the decoder (400), the encoder (500), and/or the decoder (600) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (500), and/or the decoder (600) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (500), and/or the decoder (600).

It is noted that the attribute prediction modules (550) and (650) configured to implement the attribute prediction techniques disclosed herein can be included in other decoders or encoders that may have similar or different structures from what is shown in FIG. 5 and FIG. 6. In addition, the encoder (500) and decoder (600) can be included in a same device, or separate devices in various examples.

In MPEG Geometry-based point cloud coding (G-PCC) software Test Model, i.e., TMC13, the geometry information and the associated attributes of the point clouds, such as color or reflectance, can be separately compressed. The geometry information, which is the 3D coordinates of the point clouds, can be coded by an octree-partition, a quadtree-partition, and a binary partition with the occupancy information of the point clouds. After geometry information is coded, the attributes of the point clouds can be then compressed based on reconstructed geometry using prediction, lifting, and region adaptive hierarchical transform techniques. For geometry coding, two approaches can be applied. The first one can be an octree-based approach (or octree-based geometry coding), and the second one can be a predictive tree-based approach (or predictive tree-based geometry coding).

In octree-based geometry coding, a point cloud can be partitioned by an octree, a quadtree, or a binary partition, which can be described as follows.

Figure 7:
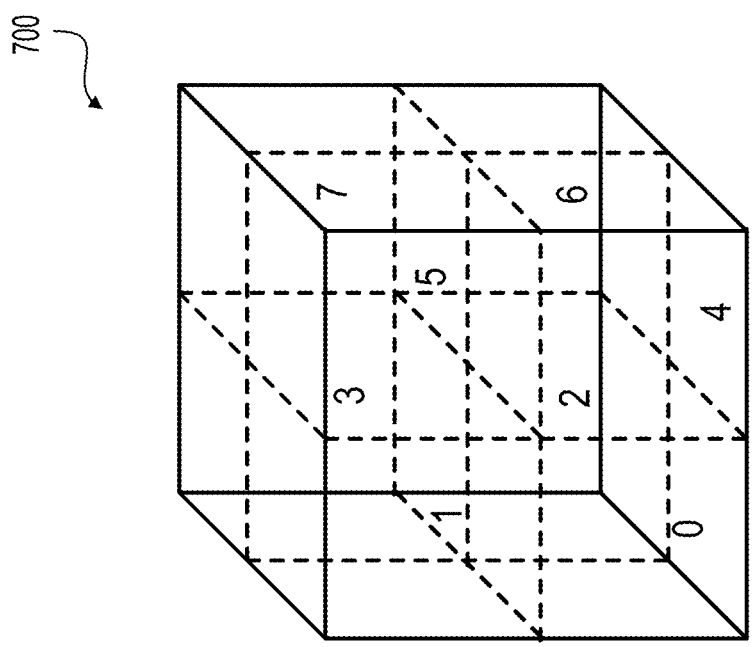
FIG. 7 shows a diagram illustrating a partition of a cube based on the octree partition technique according to some embodiments of the disclosure.
Figure 8:
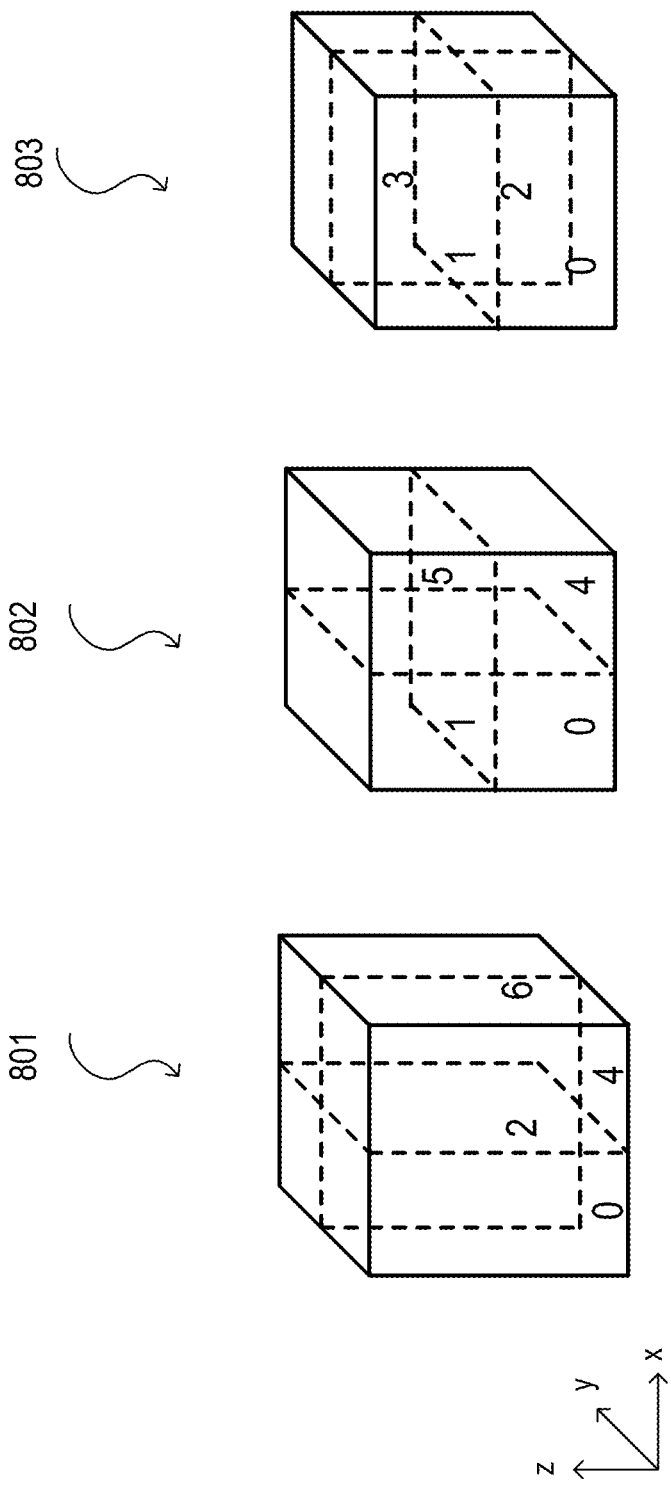
FIG. 8 shows a diagram illustrating partitions of a cube based on the quadtree partition technique along x-y, x-z, and y-z axes, according to some embodiments of the disclosure.

For a point cloud, a bounding box B of the point cloud may not be restricted to have a same size in all directions. Instead, the bounding box B can be an arbitrary-size rectangular cuboid to better fit the shape of the 3D scenes or objects. In an example, the size of the bounding box B can be represented as a power of two, such as ($2^{d_x}$, $2^{d_y}$, $2^{d_z}$). Note that $d_x$, $d_y$, $d_z$ may not be equal, To partition the bounding box B, the octree partition, the quadtree partition, or the binary partition can be utilized. FIG. 7 shows an octree-partition to partition a bounding box 700, where the x, y, and z dimensions of the bounding box 700 can be divided into half, which can result in 8 sub-boxes with a same size. FIG. 8 shows a quadtree-partition to partition a bounding box, where two of the three dimensions of the bounding box, such as x, y, and z dimensions, can be split into half, which can result in 4 sub-boxes with the same size. For example, as shown in FIG. 8, a bounding box 801 can be partitioned into 4 sub-boxes along x-y axes, a bounding box 802 can be partitioned into 4 sub-boxes along x-z axes, and a bounding box 803 can be partitioned into 4 sub-boxes along y-z axes.

Figure 9:
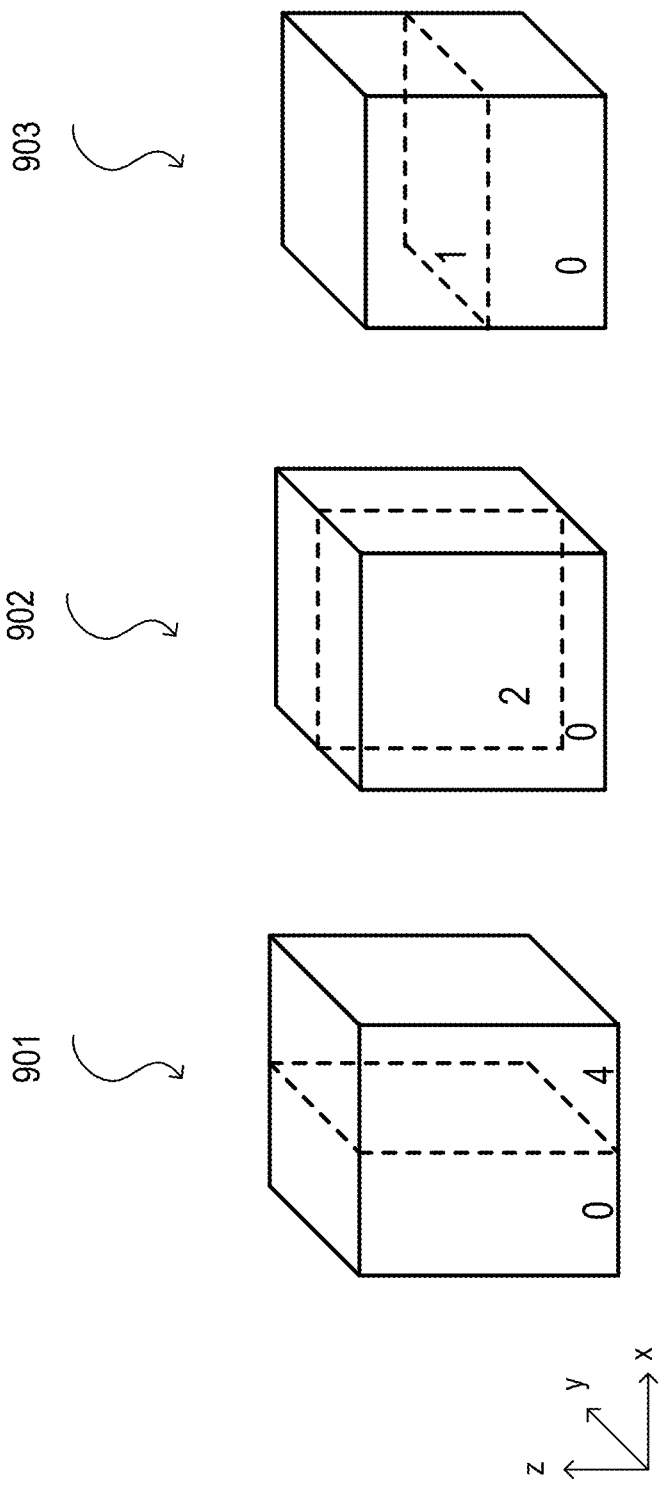
FIG. 9 shows a diagram illustrating partitions of a cube based on a binary tree partition technique along x, y, and z axes, according to some embodiments of the disclosure.

FIG. 9 shows a binary-tree partition to partition a bounding box, where only one of the three dimensions (e.g., x, y, and z dimensions), can be split into half, resulting in 2 sub-boxes with the same size. For example, as shown in FIG. 9, a bounding box 901 can be partitioned into 2 sub-boxes along an x axis, a bounding box 902 can be partitioned into 2 sub-boxes along a y axis, and a bounding box 903 can be partitioned into 2 sub-boxes along a z axis.

Thus, a point cloud can be represented by a general tree structure with an octree partition, a quadtree partition, and a binary tree partition respectively. To traverse such a tree, a breadth-first approach can be adopted in an MPEG TMC13 model. On the other hand, a depth-first approach can also be utilized, which can be illustrated in FIGS. 10A and 10B.

In FIGS. 10A and 10B, a shaded circle denotes an occupied node in the tree while a blank circle denotes an unoccupied node. The number in the circle indicates the traversal order. FIG. 10A shows the breadth-first traversal order where nodes are visited/processed starting from depth 0 followed by depth 1, 2, and so on. FIG. 10B shows the depth-first traversal order where nodes are visited/processed starting from a root node (e.g., node 0), followed by a first occupied child node (e.g., node 1) of the root node, and then to occupied child nodes (e.g., nodes 3, 4 and 5) of the first occupied child node of the root node, until leaf nodes are reached. The visiting/processing then starts from a second occupied child node (e.g., node 2) of the root node, and then to occupied child nodes (e.g., nodes 6, 7, and 8) of the second occupied child node of the root node, until leaf nodes are reached.

Figure 11:
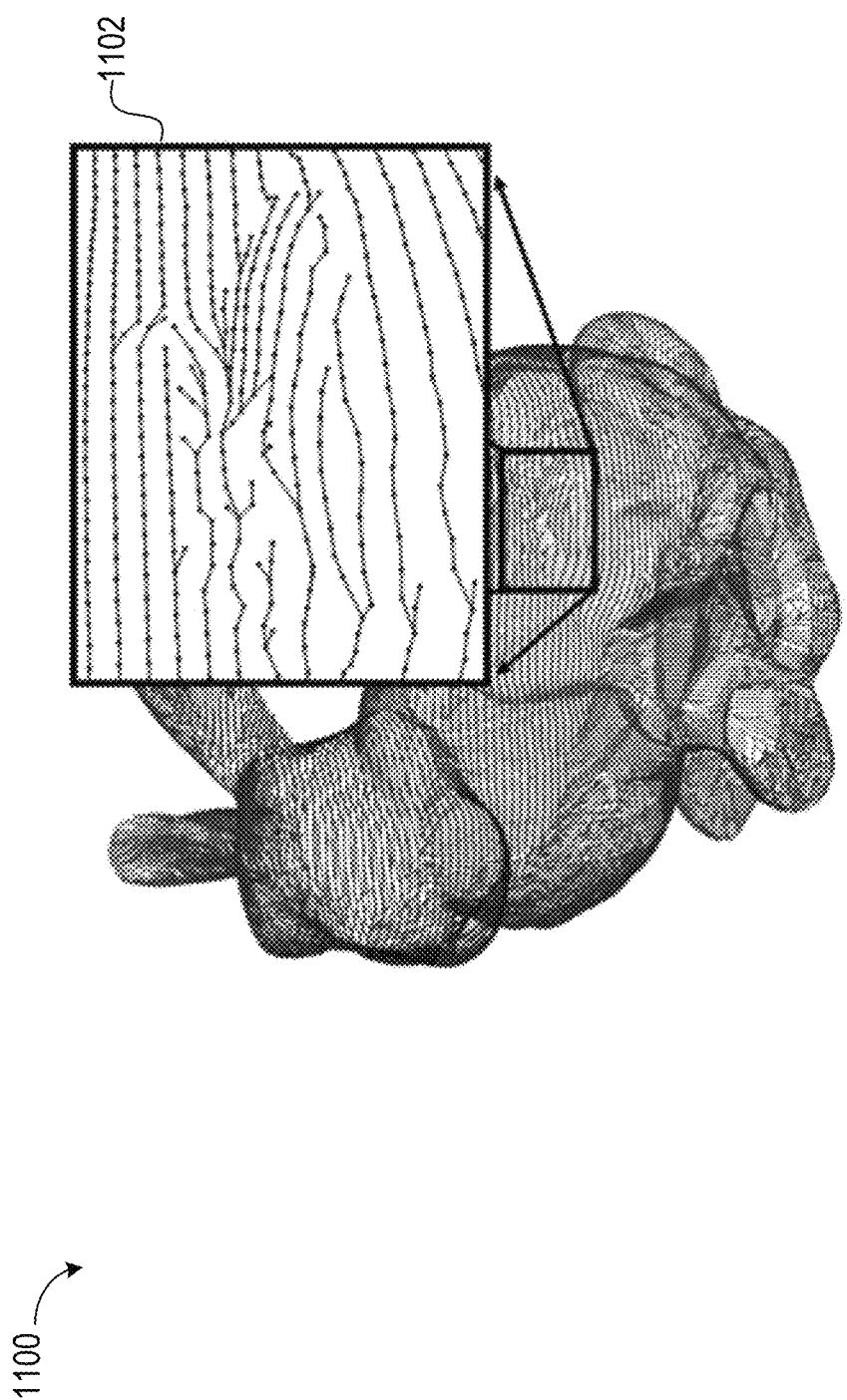
FIG. 11 is a schematic illustration of predictive tree-based geometry coding according to some embodiments of the disclosure.

In predictive tree-based geometry coding, a predictive tree, such as a spanning tree over all the points in a point cloud, can be constructed. For prediction of a point, all ancestors of the point can be used. For example, a position of the point can be predicted from a position of its parent point, or from positions of its parent and its grandparent point. FIG. 11 shows a predictive tree 1100 that spans over all the points in a point cloud presenting a surface of a rabbit, where a magnified block 1102 shows a part of the predictive tree.

Trisoup based geometry coding is another geometry coding approach which can represent the object surfaces as a series of triangle mesh. The trisoup based geometry coding can be applicable for a dense surface point cloud. A trisoup decoder can generate a point cloud from the mesh surface in the specified voxel granularity so that the density of the reconstructed point cloud can be assured. In general, the trisoup based geometry coding can introduce distortions to the original point cloud with a benefit of a reduced bitstream size.

Prediction based attribute coding for a point cloud can be described as follows. For simplicity, one level of detail (LoD) can be assumed in the prediction based attribute coding.

Let $(P_i)_{i=1 \ldots N}$ be a set of positions associated with the points of the point cloud and let $(M_i)_{i=1 \ldots N}$ be Morton codes associated with $(P_i)_{i=1 \ldots N}$. First, the points can be sorted according to the associated Morton codes of the points in an ascending order. Let I be an array of point indexes that is ordered according to the ascending order. The encoder/decoder can compress/decompress the points respectively according to the order defined by I. At each iteration i, a point $P_i$ can be selected. Distances of $P_i$ to s (e.g., s=64) previous points can be analyzed and k (e.g., k=3) nearest neighbors of $P_i$ can be selected to be used for prediction. More precisely, the attribute values $(a_i)_{i \in 1 \ldots N}$ can be predicted by using a linear interpolation process based on the distances of the nearest neighbours of point i. Let $N_i$ be the set of the k-nearest neighbours of the current point i, and let $(\tilde{a}_j)_{j \in N_i}$ be the decoded/reconstructed attribute values of the set of the k-nearest neighbours and $(\delta_j)_{j \in N_i}$ the distances of the set of the k-nearest neighbours to the current point i. A predicted attribute value $\hat{a}_i$ can be given by equation (1) as follows:

$$\hat{a}_i = \text{Round}\left(\sum_{j \in N_i} \frac{\frac{1}{\delta_j^2}}{\sum_{t \in N_i} \frac{1}{\delta_t^2}} \tilde{a}_j\right) \quad \text{Eq. (1)}$$

Lifting based attribute coding can be built upon the prediction based attribute coding. Compared with the prediction based attribute coding, two addition steps are introduced in the lifting based attribute coding: (a) introduction of an update operator; and (b) use of an adaptive quantization strategy.

Figure 12:
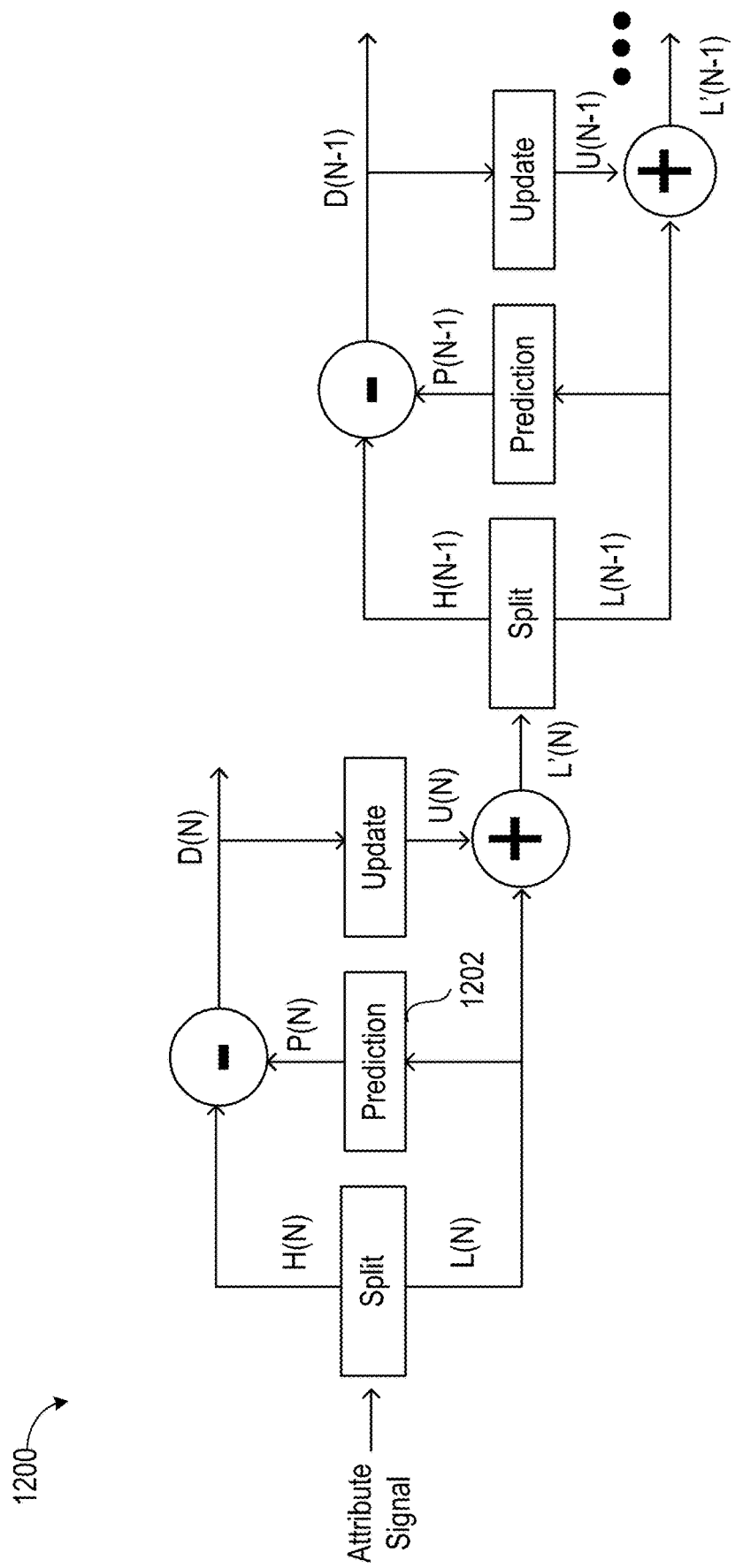
FIG. 12 shows a block diagram of a forward transform in a lifting based attribute coding according to some embodiments.
Figure 13:
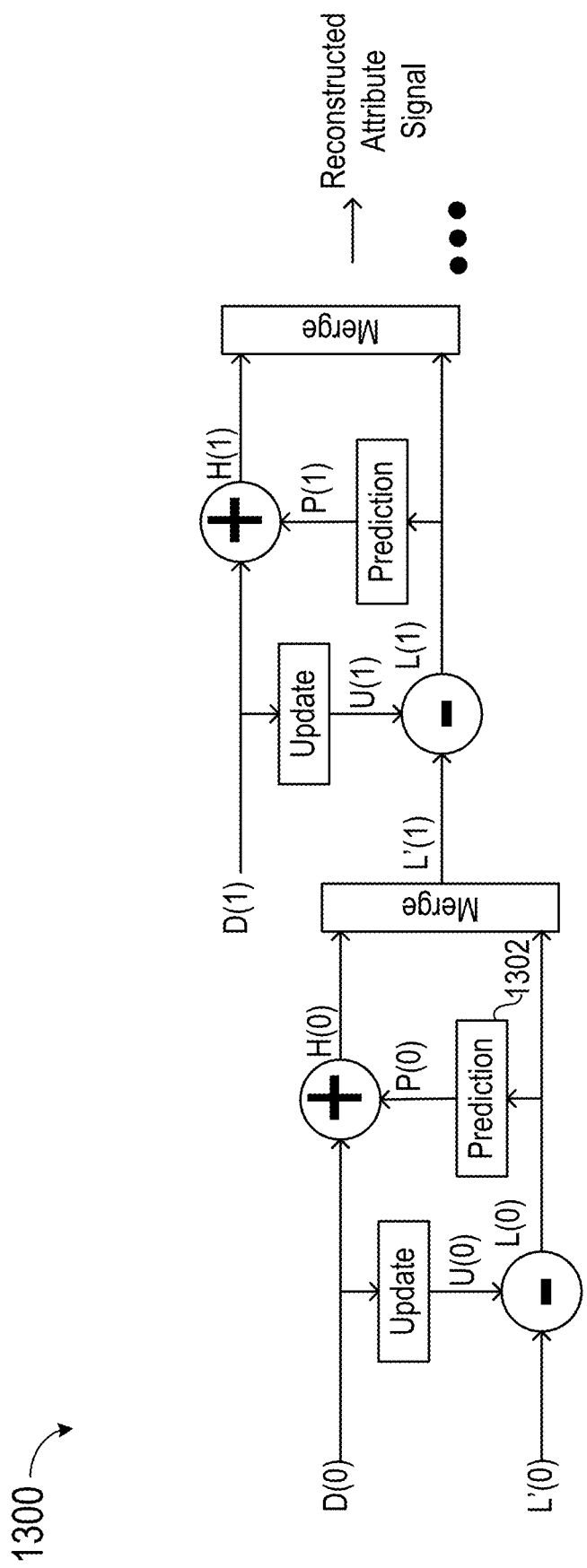
FIG. 13 shows a block diagram of an inverse transform in the lifting based attribute coding according to some embodiments.

For illustration, the operation of the lifting based attribute coding can be shown in FIGS. 12 and 13. FIG. 12 shows a block diagram of a forward transform 1200 in the lifting based attribute coding, and FIG. 13 shows a block diagram of an inverse transform 1300 in the lifting based attribute coding.

As shown in FIG. 12, an attribute signal at a level N can be split into a high-pass signal H(N) and a low-pass signal L(N). The L(N) can generate a prediction signal P(N) based on a prediction process 1202. A difference signal D(N) can be generated based on a difference between H(N) and L(N). The difference signal D(N) can further be updated to generate an updated signal U(N). A sum of the U(N) and the L(N) can generate an updated low-pass signal L'(N). The L'(N) can further be split into a high-pass signal H(N−1) and a low-pass signal L(N−1) at a subsequent level (N−1). The L(N−1) can generate a prediction signal P(N−1) at level N−1. A difference signal D(N−1) at level N−1 can be generated based on a difference between H(N−1) and L(N−1). The difference signal D(N−1) can further be updated to generate an updated signal U(N−1) at level N−1. A sum of the U(N−1) and the L(N−1) can generate an updated low-pass signal L'(N−1) at level N−1.

The updated low-pass signal L'(N−1) can further be decomposed into D(N−2) and L'(N−2). The splitting step can be repeatedly applied until an updated low-pass signal L'(0) of a base layer is obtained.

In FIG. 13, the inverse transform 1300 of the lifting based attribute coding is provided. As shown in FIG. 13, a low-pass signal L(0) at level zero can be generated based on a difference of an updated low-pass signal L'(0) and an updated signal U(0). The updated signal U(0) is obtained by updating a difference signal D(0). The L(0) can further generate a prediction signal P(0) based on a prediction process 1302. The P(0) is further added with the D(0) to generate a high-pass signal H(0). The H(0) and L(0) can be merged to generate an updated low-pass L'(1) at level one. The merging step can be repeatedly applied until a high-pass signal H(N) and a low-pass signal L(N) are generated at a level N. The H(N) and L(N) can further be merged to form the reconstructed attribute signal.

Figure 14A:
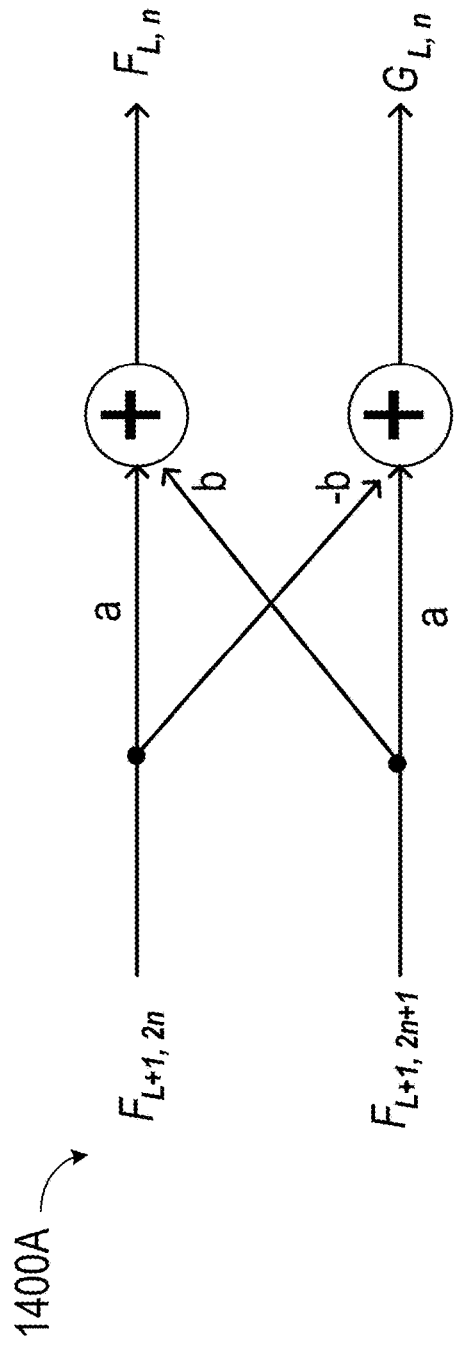
FIG. 14A shows a diagram of a forward transform in a region adaptive hierarchical transform (RAHT) based attribute coding according to some embodiments of the disclosure.
Figure 14B:
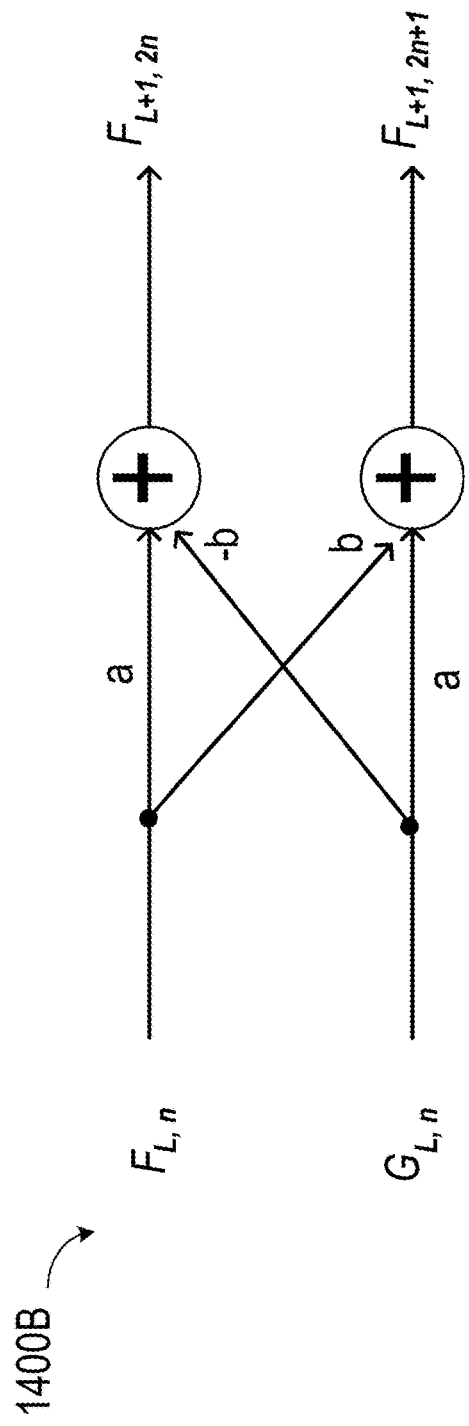
FIG. 14B shows a diagram of an inverse transform in a region adaptive hierarchical transform (RAHT) based attribute coding according to some embodiments of the disclosure.

FIG. 14A illustrates a forward transform 1400A for RAHT based attribute coding, and FIG. 14B illustrates a reverse transform 1400B for RAHT based attribute coding. In FIGS. 14A and 14B, $$a^2 = \frac{w_0}{w_0 + w_1} \text{ and } b^2 = \frac{w_1}{w_0 + w_1},$$

and $w_0$ is the notation of a weight of the input coefficient $F_{l+1,2n}$ while $w_1$ is the notation of a weight of the input coefficient $F_{l+1,2n+1}$.

Node based geometry and attribute coding for a point cloud can be a tree-based geometry and attribute coding, where a point cloud is represented as a general tree structure that includes not only octree partition but also quad-tree and binary tree partitions. The root of the tree contains the whole volume of the point cloud while the intermediate nodes of a tree contain sub-volumes (or sub-trees) of the point cloud.

For simplicity and clarity, the following notations can be applied in node based geometry and attribute coding: (a) the root node can be at depth 0 of the tree; (b) after one level of partition, the resulting nodes are at depth 1 of the tree; (c) after k level of partitions, the resulting nodes are at depth k of the tree, until all the nodes are unit nodes, such as the sizes of the nodes in all three dimensions are one.

Figure 15:
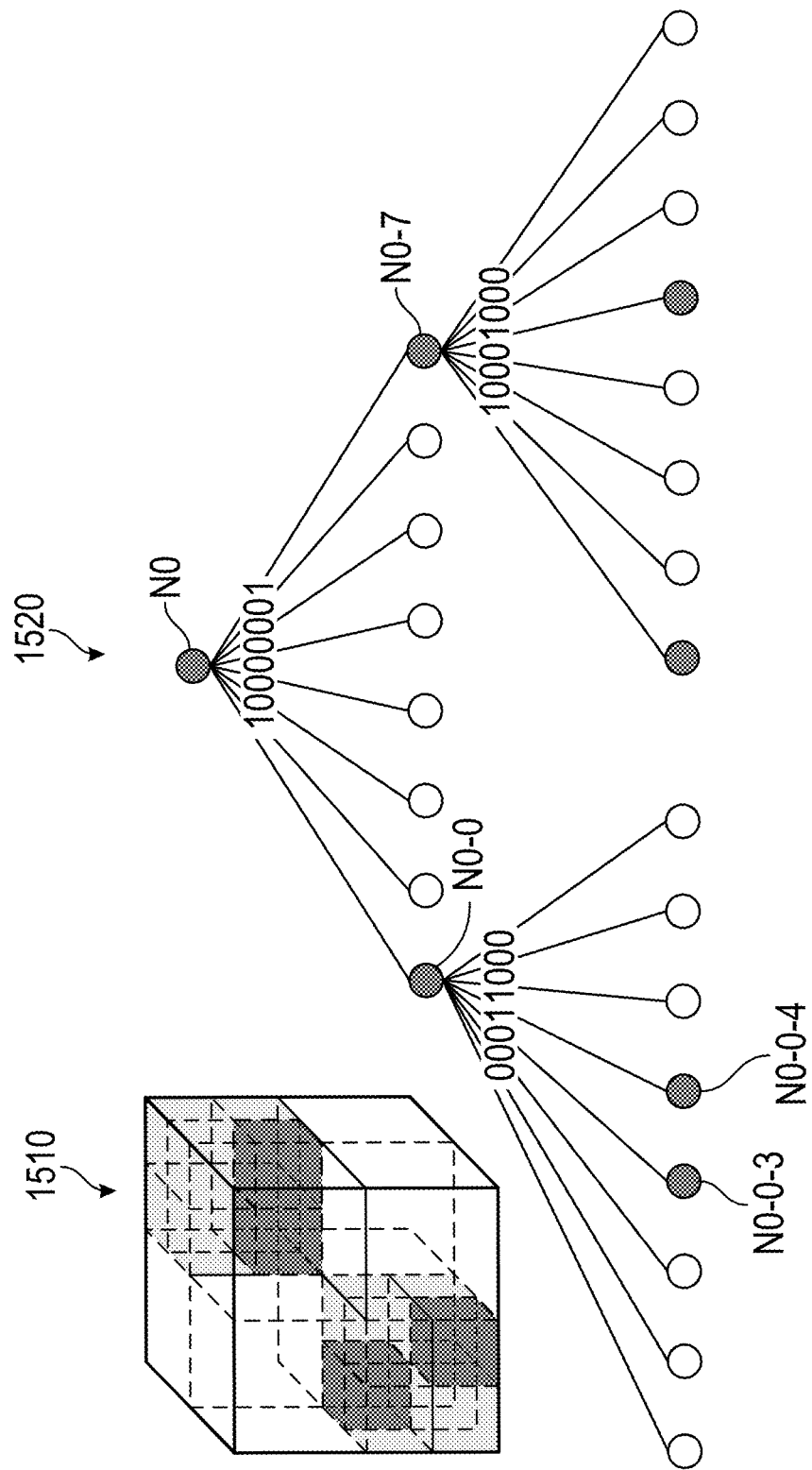
FIG. 15 shows an example of an octree partition and an octree structure corresponding to the octree partition according to some embodiments of the disclosure.

FIG. 15 shows an example of an octree partition (1510) and an octree structure (1520) corresponding to the octree partition (1510) according to some embodiments of the disclosure. FIG. 15 shows two levels of partitions in the octree partition (1510). The octree structure (1520) includes a node (N0) corresponding to the cubical box for octree partition (1510). At a first level, the cubical box is partitioned into 8 sub cubical boxes that are numbered 0-7 according to the numbering technique shown in FIG. 7. The occupancy code for the partition of the node N0 is "10000001" in binary, which indicates the first sub cubical box represented by node N0-0 and the eighth sub cubical box represented by node N0-7 includes points in the point cloud and other sub cubical boxes are empty.

Then, at the second level of partition, the first sub cubical box (represented by node N0-0) and the eighth sub cubical box (represented by node N0-7) are further respectively sub-divided into eight octants. For example, the first sub cubical box (represented by node N0-0) is partitioned into 8 smaller sub cubical boxes that are numbered 0-7 according to the numbering technique shown in FIG. 7. The occupancy code for the partition of the node N0-0 is "00011000" in binary, which indicates the fourth smaller sub cubical box (represented by node N0-0-3) and the fifth smaller sub cubical box (represented by node N0-0-4) includes points in the point cloud and other smaller sub cubical boxes are empty. At the second level, the seventh sub cubical box (represented by node N0-7) is similarly partitioned into 8 smaller sub cubical boxes as shown in FIG. 15.

In the disclosure, instead of coding attributes after the geometry coding is completed, the geometry of a point cloud can first be encoded until a depth k is reached, where k can be specified by an encoder and transmitted in the bitstream. For each occupied node at the depth k, which can be viewed as a sub-volume (or subtree) of the point cloud, the geometry information can be encoded first for all points in the node (subtree) followed by attribute coding of all points in the node. In another embodiment, the geometry coding and attribute coding for all points in the node (subtree) can be encoded in an interleaved way. In either approach, the nodes (subtree) at the depth k can be treated as a top-level coding unit. Such a concept can be similar to the LCU used in the HEVC video coding standard. In the point cloud coding concept, each node at the depth k can form a separate tree and can be viewed as an LCU, which can be shown in FIG. 16.

Figure 16:
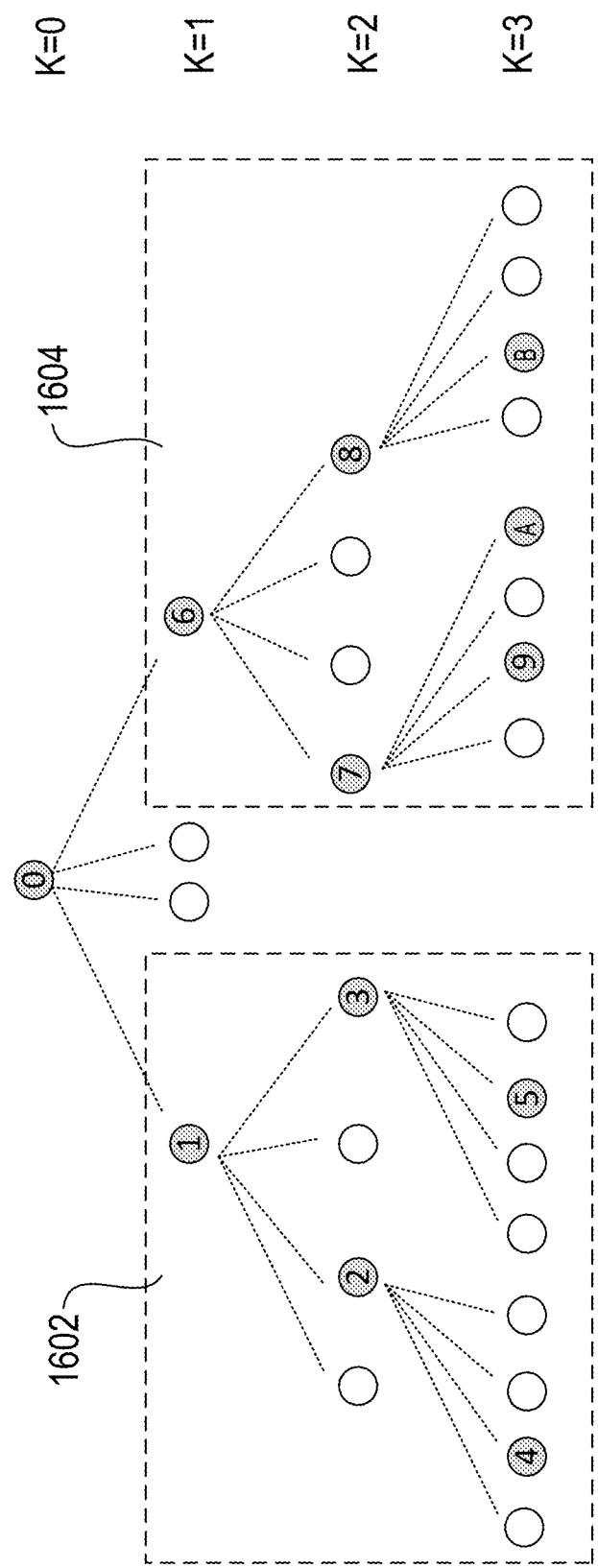
FIG. 16 shows a diagram of a node-based (LCU-based) geometry and attribute coding according to some embodiments of the disclosure.

As shown in FIG. 16, a root node at a depth k=0 can be partitioned by a quadtree partition into four nodes at a depth k=1, where two nodes (e.g., the node "1" and the node "6") of the four nodes at the depth k=1 can be occupied nodes. The two occupied nodes at the depth k=1 can further be partitioned at subsequent depths, such as at a depth k=2 and a depth k=3, respectively, and form a separate tree respectively. Thus, each of the occupied nodes at the depth k=1 can be treated as an individual LCU. For example, the node "1" at the depth k=1 can be treated as a first LCU 1602, and the node "6" at the depth k=1 can be treated as a second LCU 1604. For simplicity and clarity, a node at a depth k can be named as an LCU. Accordingly, the node and the LCU can be interchangeable terms that are applied in the disclosure.

The generated bitstreams for both geometry and attributes of each node can be transmitted without waiting for the completion of the geometry coding of the whole point cloud. On the other hand, a decoder can decode all the points of a node and display all the points of the node without waiting for the completion of the decoding of the geometry of the whole point cloud. In this way, low latency encoding and decoding can be achieved.

In one embodiment, occupied nodes at a depth k (or LCU) can be coded in Morton order. In another embodiment, occupied nodes at the depth k can be coded in other space-filling orders, other than Morton code (or Morton order).

Coding of geometry information and attribute information of an LCU can rely on information of neighbors of the LCU. In one embodiment, coding of geometry information and attribute information of an LCU may not depend on information of neighboring LCUs of the LCU. Accordingly, predictions/references across LCU boundaries may be disabled and the context and history information may need to be reinitialized for each LCU as well. Thus, maximum parallelism can be enabled at the depth k, such as LCU level parallel encoding and decoding.

In another embodiment, coding of geometry information and attribute information of an LCU can rely on information of already coded neighboring nodes of the LCU and coded child nodes of the already coded neighboring nodes. Accordingly, better compression efficiency can be gained.

In the disclosure, updates to node based geometry coding are provided, including a parallel node-based coding and methods to decide geometry coding modes at each node level.

As mentioned above, to achieve a parallel node based (or LCU based) coding, coding of geometry information and attribute information of an LCU may not depend on information of neighboring LCUs of the LCU. Therefore, predictions/references across LCU boundaries may be disabled and the context and history information may need to be reinitialized for each LCU as well.

In one embodiment of the disclosure, at each LCU, a coding state, such as a context for entropy coding and geometry occupancy history information, and/or other necessary state information of LCU based coding (or node based coding), can be set as an initial state, which can be the state when coding of the point cloud starts.

In another embodiment, instead of using the initial state, the coding state, such as the context for entropy coding and geometry occupancy history information, etc., can be stored right before a first LCU at an octree depth K is reached, such as when the encoding of a point cloud at an octree depth k−1 is completed, where the nodes at the octree depth k can be treated as LCUs. When encoding each LCU of the LCUs at the octree depth k, the coding state can be set with the stored encoding state (or stored coding state) that is mentioned above. In this way, the parallel node based (or LCU base) coding can be achieved. In addition, the stored coding state may help improve the coding performance, compared to the initial coding state that is obtained before the coding process starts.

Figure 17:
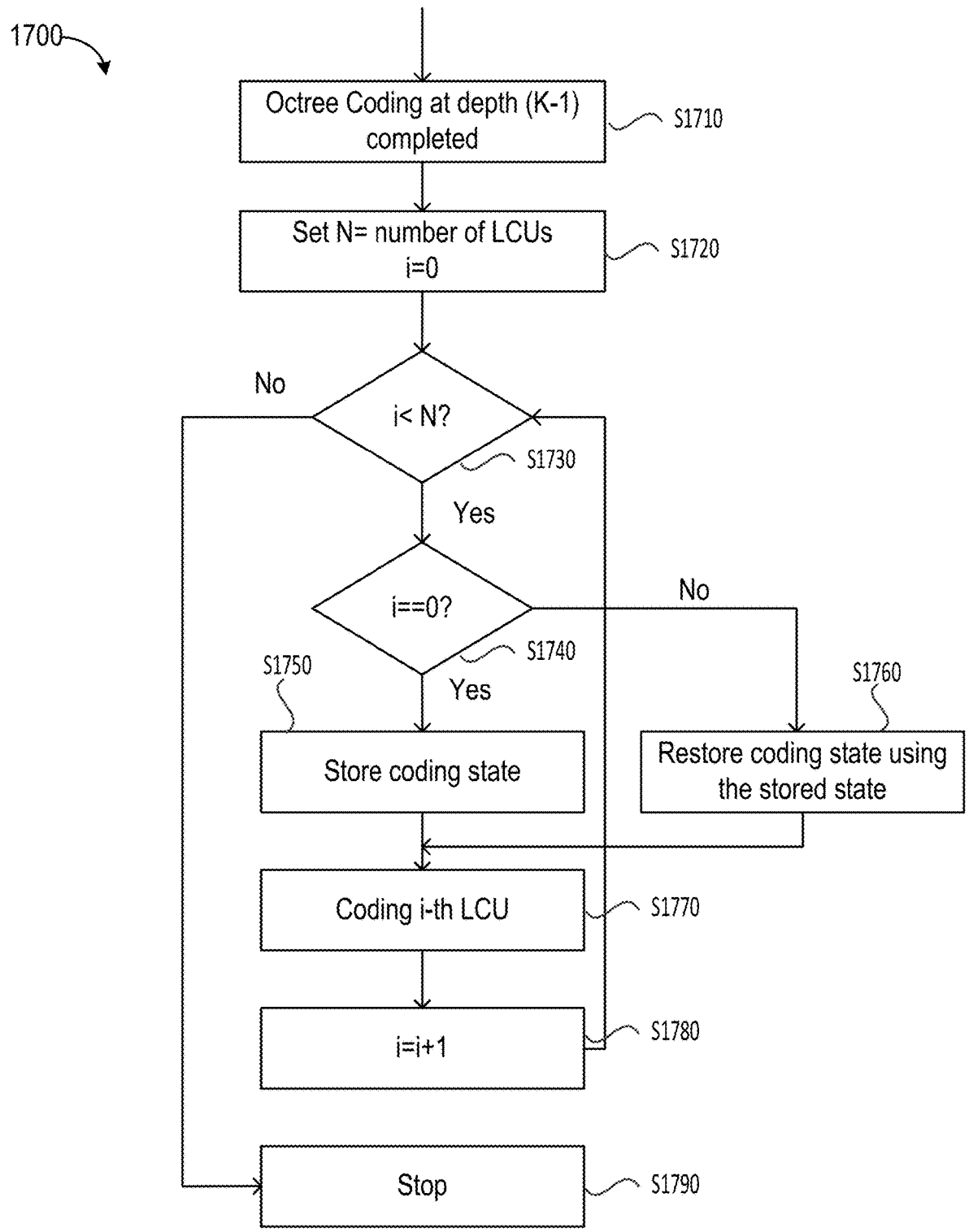
FIG. 17 shows a flow chart outlining a parallel node-based (LCU-based) coding according to some embodiments of the disclosure.

FIG. 17 shows a flow chart that illustrates an exemplary parallel node based (LCU based) coding using a stored coding state. In FIG. 17, a number of N LCUs (nodes) can be provided at an octree depth k, where N is a positive integer. Compared to related examples, a coding state can be stored before encoding any of the N LCUs at the octree depth k. At the beginning of coding of an LCU at the octree depth k, the code state can be restored or set using the stored state.

As shown in FIG. 17, a node-based coding process (1700) (or process (1700)) can start with (S1710), where a point cloud can be encoded at an octree depth k-1. The process (1700) can then proceed to (S1720) at an octree depth K, where a plurality of LCUs can be determined at the octree depth k. In some embodiments, the plurality of LCUs can further be sorted, for example based on Morton order or other space-filling orders. A number of the plurality of LCUs at the octree depth k can be equal to a positive integer N. In addition, an index i can be applied that indicates sorted orders of the plurality of LCUs at the octree depth K. The index i can be in a range from 0 to N−1. At (S1720), the index i can be set as zero, which indicates a first LCU of the plurality of LCUs at the octree depth k.

At (S1730), a first determination process can be made to determine whether the index i is smaller than N. In response to the index i being determined to be equal to or larger than N, the process (1700) can proceed to (S1790), which indicates that all LCUs at the octree depth k are coded, and the process (1700) is completed. In response to the index i being determined to be smaller than N, the process (1700) can proceed to (S1740), where a second determination process can be made to determine whether the index i is equal to 0. When the index i is equal to 0, it indicates that the first LCU of the plurality of LCUs is to be coded. When the index i is not equal to 0, it indicates that a LCU of the plurality of LCUs other than the first LCU is to be coded.

When the index i is determined to be equal to 0 at (S1740), the process (1700) can proceed to (S1750), where a coding state can be stored. As mentioned above, the coding state can be obtained after the point cloud is coded at the octree depth k-1, and stored prior to the first LCU of the plurality of LCUs of the point cloud being coded. The process (1700) can then proceed to (S1770), where the first LCU can be coded. The process (1700) can further proceed to (S1780), where the index i can be incremented by one. Thus, a LCU subsequent to the LCU (e.g., the first LCU) just coded at (S1770) can be selected for coding. The process (1700) can then proceed to (S1730) to perform the first determination process again.

Still referring to (S1740), when the index i is determined not to be equal to 0, the process (1700) can proceed to (S1760). At (S1760), the coding state can be set, or otherwise determined, with the stored coding state that is mentioned above at (S1750). The process (1700) can then proceed to (1770), where the LCU with the index i can be coded based on the coding state that is set with the stored coding state at (S1760). Thus, when each of the plurality of LCUs is to be coded, the coding state can first be set with the stored coding state. Accordingly, the parallel node based (LCU base) coding can be achieved.

In the discussion above, the plurality of LCUs can be coded based on octree-based geometry coding. However, other geometry coding methods can also be applied in process (1700). For example, the predictive tree-based coding can also be applied to code the plurality of LCUs.

In related examples, for an LCU, the geometry coding mode can be determined based on heuristics. For example, the octree-based geometry coding can be applied for coding a relatively dense point cloud while the predictive tree-based geometry coding can be applied for coding a sparse point cloud that can be generated by a Lidar from autonomous driving vehicles.

In one embodiment, a density of an LCU can be used to determine the geometry coding mode. Without loss of generality, the octree-based geometry coding and the predictive tree-based geometry coding can be used as examples for illustration. Of course, other types of geometry coding modes can be applied.

In order to determine the geometry coding mode, a density of an LCU can firstly be computed as the follows in equation (2):

$$\text{LCU\_density} = \text{a number of points in an LCU/a volume of the LCU} \quad \text{Eq. (2)}$$

To compute the volume of an LCU, a nominal bounding box of the LCU can be applied. The nominal bounding box of the LCU can be determined based on an octree partition depth, an octree partition type, and a bounding box of the point cloud. For example, assuming that the bounding box of a point cloud is $(2^{d_x}, 2^{d_y}, 2^{d_z})$ and at an octree partition depth k, the nominal bounding box of each node (LCU) at the octree partition depth k can be reduced to $(2^{n_x}, 2^{n_y}, 2^{n_z})$, where $n_x \leq d_x$, $n_y \leq d_y$, $n_z \leq d_z$ based on the octree partition type (octree, quadrature tree or binary tree partition). Thus, the volume of an LCU can be computed as follows in equation (3):

$$\text{volume of LCU} = 2^{b_x} 2^{b_y} 2^{b_z} \quad \text{Eq. (3)}$$

In another embodiment, an actual bounding box of an LCU can be computed based on the points inside the LCU. The 3D coordinates of all points in an LCU can be denoted as $(x_i, y_i, z_i)$ for $i=0, 1, \ldots, N-1$, where N is the number of points in the LCU. The min and max values along x, y, and z dimensions can be computed in equations (4)-(9):

$$x_{min} = \min(x_0, x_1, \ldots, x_{N-1}) \quad \text{Eq. (4)}$$

$$x_{max} = \max(x_0, x_1, \ldots, x_{N-1}) \quad \text{Eq. (5)}$$

$$y_{min} = \min(y_0, y_1, \ldots, y_{N-1}) \quad \text{Eq. (6)}$$

$$y_{max} = \max((y_0, y_1, \ldots, y_{N-1}) \quad (7)$$

$$z_{min} = \min(z_0, z_1, \ldots, z_{N-1}) \quad \text{Eq. (8)}$$

$$z_{max} = \max(z_0, z_1, \ldots, z_{N-1}) \quad \text{Eq. (9)}$$

The volume of the LCU can be computed as follows in equation (10):

$$\text{volume of LCU} = (x_{max}+1-x_{min})(y_{max}+1-y_{min})(z_{max}+1-z_{min}) \quad \text{Eq. (10)}$$

Given the density of an LCU, and one threshold, $D_{th}$, the geometry coding mode can be determined as follows:

If $\text{LCU\_Density} \leq D_{th}$, the predictive tree-based geometry coding can be used for the LCU.

Otherwise, if $\text{LCU\_Density} \geq D_{th}$, the octree-based geometry coding can be used for the LCU.

In another embodiment, two thresholds, $D_{th\_low}$ and $D_{th\_high}$, can be defined, where $D_{th\_low} \leq D_{th\_high}$. The geometry coding mode can then be determined as follows:

If $D_{th\_low} \leq \text{LCU\_Density} \leq D_{th\_high}$, the predictive tree-based geometry coding can be used for the LCU;

Otherwise, if $D_{th\_low} > \text{LCU}_{Density}$ or $\text{LCU}_{Density} > D_{th\_high}$, the octree-based geometry coding can be used for the LCU.

In yet another embodiment, two density thresholds $D_{th\_low}$ and $D_{th\_high}$, and another point number threshold $N_{th}$ can be defined. The geometry coding mode can be determined as follows:

If $D_{th\_low} \leq \text{LCU\_Density} \leq D_{th\_high}$ and $N \geq N_{th}$, the predictive tree-based geometry coding can be used for the LCU.

Otherwise, if $D_{th\_low}$>LCU_Density, or LCU$_{Density}$>$D_{th\_high}$, or N<$N_{th}$, the octree coding can be used for the LCU.

Similarly, multiple density thresholds and point number thresholds can be defined and be used to determine geometry coding mode among two or more candidates. Similar methods can be used to determine attribute coding modes among two or more candidates.

Since the geometry coding modes for LCUs can be different, signaling information needs to be sent in the bitstream to indicate to the decoder which geometry coding mode is used. A corresponding syntax can be specified in Table 1 as follows:

TABLE 1

A syntax table to specify the geometry coding mode

|  | Descriptor |
|---|---|
| geometry_LCU( ) { | ae(v) |
|   geometry_coding_mode |  |
|   if (geometry_coding_mode == 0) { |  |
|     octree_lcu_coding( ) |  |
|   } else { |  |
|     preditve_tree_lcu_coding( ) |  |
|   } |  |
| } |  |

A shown in Table 1, a geometry coding mode flag (e.g., geometry_coding_mode) can specify the geometry coding mode used for coding the LCU. When the geometry coding mode flag is set to be 0, the octree-based geometry coding can be applied. When the geometry coding mode flag is set to be 1, the predictive tree-based geometry coding can be used. Accordingly, first signaling information (e.g., octree_lcu_coding( )) can be signaled based on Table 1 to specify the usage of the octree based geometry coding when the geometry coding mode flag is equal to 0. Second signaling information (e.g., preditve_tree_lcu_coding( )) can be signaled based on Table 1 to specify the usage of the predictive tree-based geometry coding when the geometry coding mode flag is equal to 1. Note the geometry coding mode flag can be entropy coded with a context. In another embodiment, the geometry coding mode flag can be coded with a by-pass coding.

In another embodiment, three modes can be used. Without loss of generality, the three geometry coding modes can be denoted as a first_mode, a second_mode, and a third_mode. A corresponding syntax table can be specified in Table 2 as follows:

TABLE 2

A syntax table to specify three geometry coding modes

|  | Descriptor |
|---|---|
| geometry_LCU( ) { | ae(v) |
|   geometry_coding_mode |  |
|   if (geometry_coding_mode == 0) { |  |
|     first_mode_lcu_coding( ) |  |
|   } else if (geometry_coding_mode == 1){ |  |
|     second_mode_lcu_coding( ) |  |
|   } else { |  |
|     third_mode_lcu_coding( ) |  |
|   } |  |
| } |  |

As shown in Table 2, the geometry coding mode flag (e.g., geometry_coding_mode) can specify the geometry coding mode used for the LCU. When the geometry coding mode flag is set to be 0, the first_mode geometry coding can be used. When the geometry coding mode flag is set to be 1, the second_mode geometry coding can be used. Otherwise, when the geometry coding mode flag is set to be neither 0 nor 1, the third_mode geometry coding can be used. Accordingly, first signaling information (e.g., first_mode_lcu_coding( )) can be signaled based on the Table 2 to specify the usage of the first_mode geometry coding when the geometry coding mode flag is equal to 0. Second signaling information (e.g., second_mode_lcu_coding( )) can be signaled based on the Table 2 to specify the usage of the second_mode geometry coding when the geometry coding mode flag is set to 1. Third signaling information (e.g., third_mode_lcu_coding( )) be signaled based on the Table 2 to specify the usage of the third_mode geometry coding when the geometry coding mode flag is set be a value other than 0 or 1.

Without loss of generality, the first mode can be most frequently applied. Accordingly, the geometry coding mode flag (e.g., geometry_coding_mode) can be binarized as follows: (a) Bin0=1 can denote the first_mode; (2) Bin0=0 and Bin1=1 can denote the second_mode; and (c) Bin0=0 and Bin1=0 can denote the third_mode, where Bin0 and Bin1 can be entropy coded with separate contexts.

The proposed methods may be used separately or combined in any order. Further, each of the methods (or embodiments), encoder, and decoder may be implemented by processing circuitry (e.g., one or more processors or one or more integrated circuits). In one example, the one or more processors can execute a program that is stored in a non-transitory computer-readable medium.

It should be noted that the disclosure is not limited to the TMC13 software, MPEG-PCC, or AVS-PCC standard. The current disclosure provides a general solution for other systems, such as PCC systems.

Figure 18:
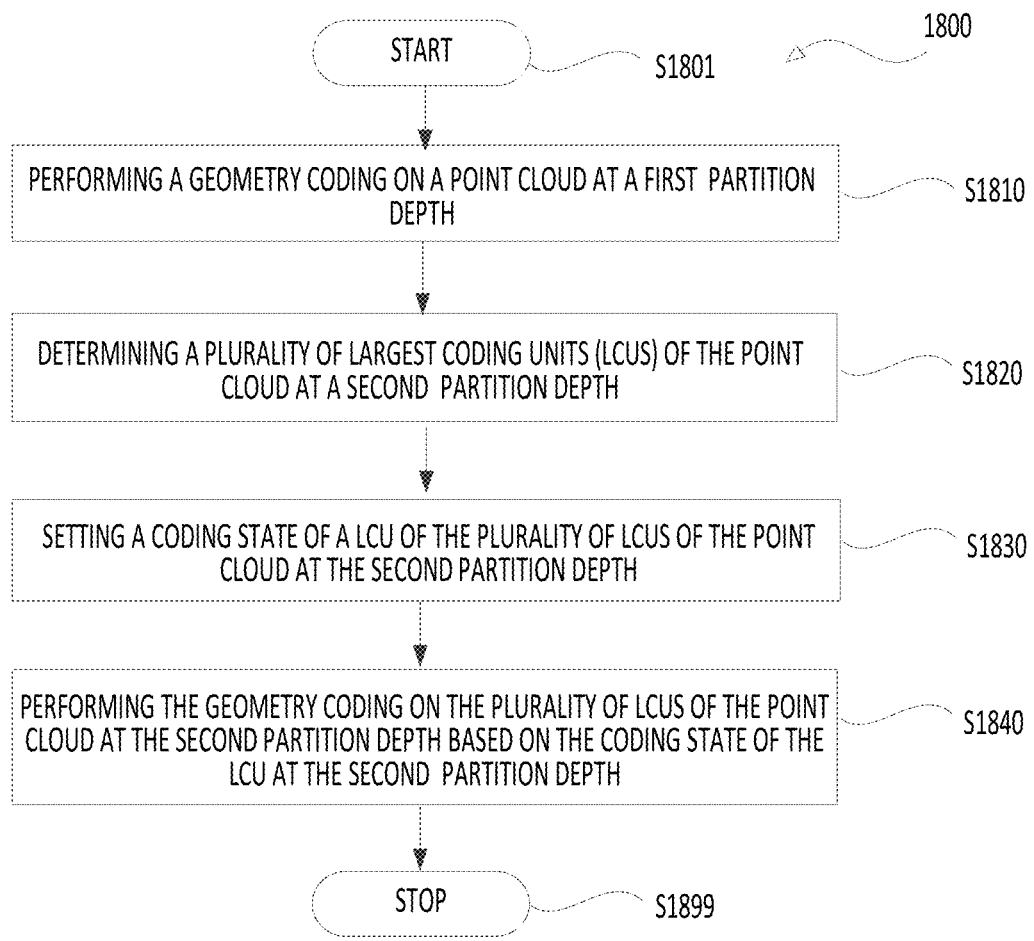
FIG. 18 shows a flow chart outlining a first exemplary decoding process in accordance with some embodiments.
Figure 19:
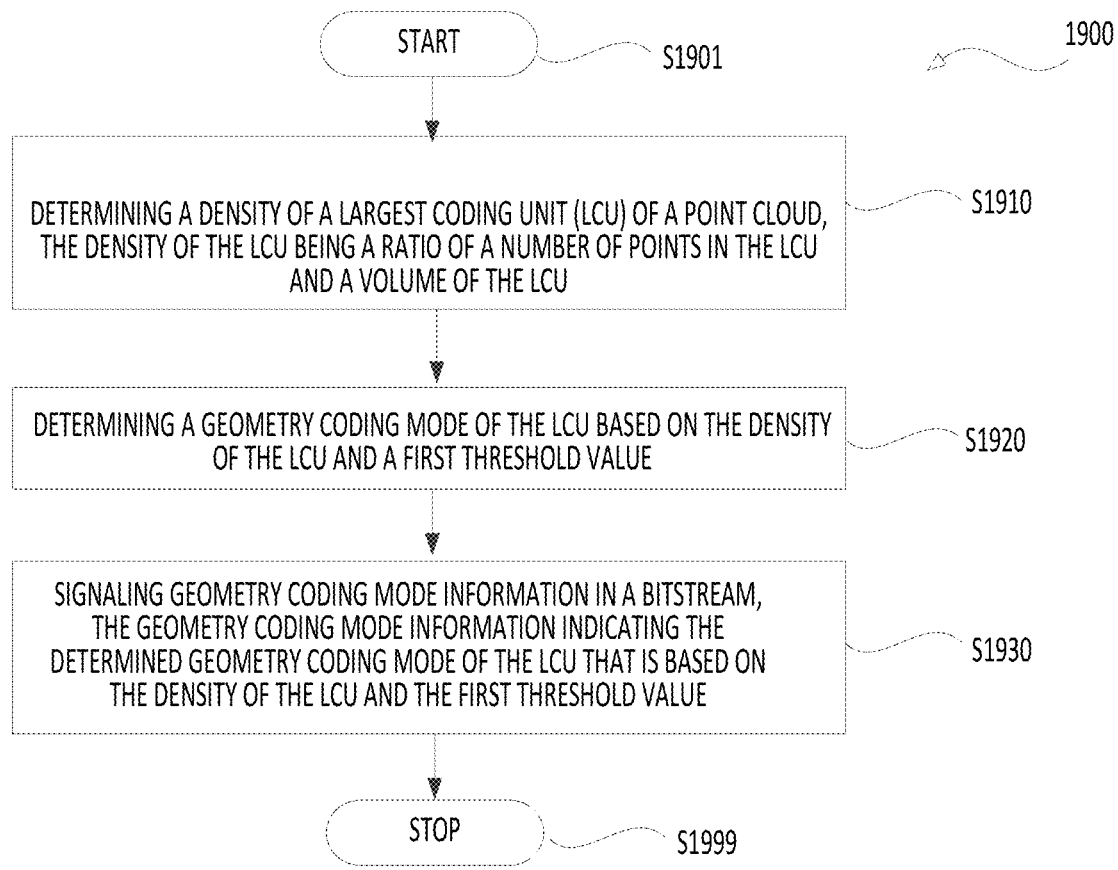
FIG. 19 shows a flow chart outlining a second exemplary decoding process in accordance with some embodiments

FIGS. 18 and 19 show a flow chart outlining a process (1800) and a process (1900) according to embodiments of the disclosure. The processes (1800) and (1900) can be used during encoding and/or decoding processes for point clouds. In various embodiments, the processes (1800) and (1900) can be executed by processing circuitry, such as the processing circuitry in the terminal devices (110), the processing circuitry that performs functions of the encoder (203) and/or the decoder (201), the processing circuitry that performs functions of the encoder (300), the decoder (400), the encoder (500), and/or the decoder (600), and the like. In some embodiments, the processes (1800) and (1900) can be implemented in software instructions, thus when the processing circuitry executes the software instructions, the processing circuitry performs the processes (1800) and (1900) respectively.

As shown in FIG. 18, the process (1800) starts at (S1801) and proceeds to (S1810).

At (S1810), a geometry coding can be performed on a point cloud at a first partition depth.

At (S1820), a plurality of LCUs of the point cloud can be determined at a second partition depth.

At (S1830), a coding state of a LCU of the plurality of LCUs of the point cloud can be set at the second partition depth.

At (S1840), the geometry coding can be performed on the plurality of LCUs of the point cloud at the second partition depth based on the coding state of the LCU at the second partition depth.

In some embodiments, the geometry coding can include one of an octree-based geometry coding and a predictive tree-based coding.

In an embodiment, the coding state of the LCU can be set with an initial state of the point cloud, where the initial state of the point cloud can be obtained prior to the point cloud being coded at a root node partitioned from the point cloud based on the geometry coding.

In another embodiment, when the LCU is a first LCU of the plurality of LCUs of the point cloud at the second partition depth, the coding state can be obtained and stored after the point cloud is coded based on the geometry coding at the first partition depth.

In yet another embodiment, when the LCU is not the first LCU of the plurality of LCUs of the point cloud at the second partition depth, the coding state of the LCU can be set with a stored coding state. The stored coding state can be either (i) obtained after the point cloud is coded based on the geometry coding at the first partition depth or (ii) stored prior to the first LCU of the plurality of LCUs of the point cloud being coded based on the geometry coding at the second partition depth.

In some embodiments, the coding state can include at least one of a context for an entropy coding associated with the LCU or geometry occupancy history information associated with the LCU.

In some embodiments, each of the plurality of LCUs can include a respective node at the second partition depth.

As shown in FIG. 19, the process (1900) starts at (S1901) and proceeds to (S1910).

At (S1910), a density of LCU of a point cloud can be determined. The density of the LCU can be a ratio of a number of points in the LCU and a volume of the LCU.

At (S1920), a geometry coding mode of the LCU can be determined based on the density of the LCU and a first threshold value.

At (S1930), geometry coding mode information can further be signaled in a bitstream. The geometry coding mode information can indicate the determined geometry coding mode of the LCU that is based on the density of the LCU and the first threshold value.

In an example, the geometry coding mode of the LCU can be determined as a predictive tree geometry coding based on the density of the LCU being equal to or less than the first threshold value. In another example, the geometry coding mode of the LCU can be determined as an octree-based geometry coding based on the density of the LCU being larger than the first threshold value.

In an example, the geometry coding mode of the LCU can be determined as a predictive tree geometry coding based on the density of the LCU being equal to or larger than the first threshold value and equal to or less than a second threshold value, where the second threshold value can be larger than the first threshold value. In yet another example, the geometry coding mode of the LCU can be determined as an octree-based geometry coding based on the density of the LCU being either less than the first threshold value or larger than the second threshold value.

In an example, the geometry coding mode of the LCU can be determined as a predictive tree geometry coding based on (i) the density of the LCU being equal to or larger than the first threshold value and equal to or less than a second threshold value, and (ii) the number of points in the LCU being equal to or larger than a point number threshold value. In another example, the geometry coding mode of the LCU can be determined as an octree-based geometry coding based on one of (i) the density of the LCU being either less than the first threshold value or larger than the second threshold value, and (ii) the number of points in the LCU being less than the point number threshold value.

In some embodiments, the geometry coding mode information can be signaled with a first value based on the geometry coding mode being a first geometry coding mode. The geometry coding mode information can be signaled with a second value based on the geometry coding mode being a second geometry coding mode.

In the process (1900), the geometry coding mode information can be entropy coded with a context or can be coded with a by-pass coding.

In an embodiment, the geometry coding mode information can be signaled with a first value based on the geometry coding mode being a first geometry coding mode. In another embodiment, the geometry coding mode information can be signaled with a second value based on the geometry coding mode being a second geometry coding mode. In yet another example, the geometry coding mode information can be signaled with a third value based on the geometry coding mode being a third geometry coding mode.

In some embodiments, binarization information can be signaled with a first value in only a first bin, where the binarization information with the first value can be indicative of a first geometry coding mode. In some embodiments, the binarization information can be signaled with a second value in the first bin and with the first value in a subsequent second bin, where the binarization information with the second value in the first bin and with the first value in the second bin can be indicative of a second geometry coding mode. In some embodiments, the binarization information can be signaled with the second value in the first bin and with the second value in the second bin, where the binarization information with the second value in the first and second bins can be indicative of a third geometry coding mode.

In some embodiments, the binarization information in the first bin can be entropy coded with a first context and the binarization information in the second bin can be entropy coded with a second context.

As noted above, techniques described above can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
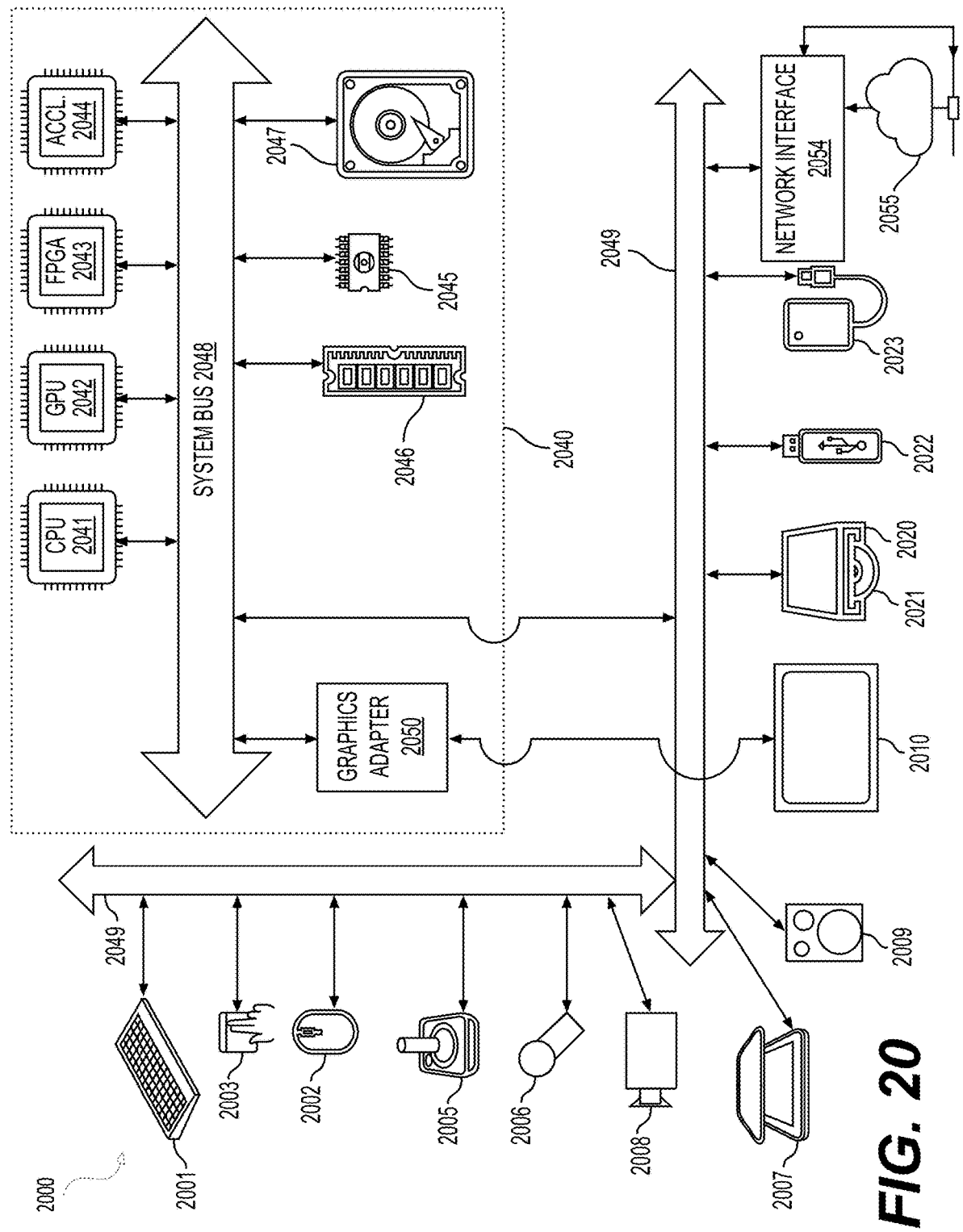
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein.

Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of point cloud geometry encoding in a point cloud encoder, comprising:
   performing a geometry coding on a point cloud at a first partition depth;
   determining a plurality of largest coding units (LCUs) of the point cloud at a second partition depth;
   setting (i) a coding state of a first LCU of the plurality of LCUs of the point cloud at the second partition depth based on an initial state or a coding state that is obtained after the point cloud is coded according to the geometry coding at the first partition depth and (ii) a coding state of a second LCU of the plurality of LCUs that is subsequent to the first LCU based on a stored state that is stored before the second LCU at the second partition depth is encoded; and
   performing the geometry coding on the plurality of LCUs of the point cloud at the second partition depth based on the set coding states of the plurality of LCUs at the second partition depth,
   wherein the coding state of the first LCU comprises geometry occupancy history information associated with the first LCU.

2. The method of claim 1, wherein the geometry coding comprises one of an octree-based geometry coding and a predictive tree-based coding.

3. The method of claim 1, wherein the setting the coding state of the first LCU comprises:
   setting the coding state of the first LCU with the initial state of the point cloud, the initial state of the point cloud being obtained prior to the point cloud being coded based on the geometry coding.

4. The method of claim 1, wherein the setting the coding state of the first LCU comprises:
   storing the coding state of the first LCU that is obtained after the point cloud is coded based on the geometry coding at the first partition depth.

5. The method of claim 1, wherein the setting the coding state of the second LCU comprises:
   setting the coding state of the second LCU with the stored coding state that is either (i) obtained after the point cloud is coded based on the geometry coding at the first partition depth or (ii) stored prior to the first LCU of the plurality of LCUs of the point cloud being coded based on the geometry coding at the second partition depth.

6. The method of claim 1, wherein the coding state of the first LCU further comprises a context for an entropy coding associated with the first LCU.

7. The method of claim 1, wherein each of the plurality of LCUs includes a respective node at the second partition depth.

8. An apparatus for processing point cloud data, comprising:
   processing circuitry configured to:
      perform a geometry coding on a point cloud at a first partition depth;
      determine a plurality of largest coding units (LCUs) of the point cloud at a second partition depth;
      set (i) a coding state of a first LCU of the plurality of LCUs of the point cloud at the second partition depth based on an initial state or a coding state that is obtained after the point cloud is coded according to the geometry coding at the first partition depth and (ii) a coding state of a second LCU of the plurality of LCUs subsequent to the first LCU based on a stored state that is stored before the second LCU at the second partition depth is encoded; and
      perform the geometry coding on the plurality of LCUs of the point cloud at the second partition depth based on the set coding states of the plurality of LCUs at the second partition depth,
   wherein the coding state of the first LCU comprises geometry occupancy history information associated with the first LCU.

9. The apparatus of claim 8, wherein the processing circuitry is further configured to:
   set the coding state of the first LCU with the initial state of the point cloud, the initial state of the point cloud being obtained prior to the point cloud being coded based on the geometry coding.

10. The apparatus of claim 8, wherein the processing circuitry is further configured to:
    store the coding state of the first LCU that is obtained after the point cloud is coded based on the geometry coding at the first partition depth.

11. The apparatus of claim 8, wherein the processing circuitry is further configured to:
    set the coding state of the second LCU with the stored coding state that is either (i) obtained after the point cloud is coded based on the geometry coding at the first partition depth or (ii) stored prior to the first LCU of the plurality of LCUs of the point cloud being coded based on the geometry coding at the second partition depth.

12. The apparatus of claim 8, wherein the geometry coding comprises one of an octree-based geometry coding and a predictive tree-based coding.

13. The apparatus of claim 8, wherein the coding state of the first LCU further comprises a context for an entropy coding associated with the first LCU.

14. The apparatus of claim 8, wherein each of the plurality of LCUs includes a respective node at the second partition depth.

15. A non-transitory computer-readable storage medium storing instructions which when executed by a processor cause the processor to perform:
    performing a geometry coding on a point cloud at a first partition depth;
    determining a plurality of largest coding units (LCUs) of the point cloud at a second partition depth;
    setting (i) a coding state of a first LCU of the plurality of LCUs of the point cloud at the second partition depth based on an initial state or a coding state that is obtained after the point cloud is coded according to the geometry coding at the first partition depth and (ii) a coding state of a second LCU of the plurality of LCUs that is subsequent to the first LCU based on a stored state that is stored before the second LCU at the second partition depth is encoded; and performing the geometry coding on the plurality of LCUs of the point cloud at the second partition depth based on the set coding states of the plurality of LCUs at the second partition depth, wherein the coding state of the first LCU comprises geometry occupancy history information associated with the first LCU.

16. The non-transitory computer-readable storage medium of claim 15, wherein the geometry coding comprises one of an octree-based geometry coding and a predictive tree-based coding.

17. The non-transitory computer-readable storage medium of claim 15, wherein the setting the coding state of the first LCU comprises:

setting the coding state of the first LCU with the initial state of the point cloud, the initial state of the point cloud being obtained prior to the point cloud being coded based on the geometry coding.

18. The non-transitory computer-readable storage medium of claim 15, wherein the setting the coding state of the first LCU comprises:

storing the coding state of the first LCU that is obtained after the point cloud is coded based on the geometry coding at the first partition depth.

19. The non-transitory computer-readable storage medium of claim 15, wherein the setting the coding state of the second LCU comprises:

setting the coding state of the second LCU with the stored coding state that is either (i) obtained after the point cloud is coded based on the geometry coding at the first partition depth or (ii) stored prior to the first LCU of the plurality of LCUs of the point cloud being coded based on the geometry coding at the second partition depth.

20. The non-transitory computer-readable storage medium of claim 15, wherein the coding state of the first LCU further comprises a context for an entropy coding associated with the first LCU.

* * * * *